(12) United States Patent
Inada

(10) Patent No.: US 7,522,190 B2
(45) Date of Patent: Apr. 21, 2009

(54) IMAGE DETECTION PROCESSING DEVICE FOR CALCULATING THE MOMENTS OF IMAGE DATA

(75) Inventor: Yoshiaki Inada, Tokyo (JP)

(73) Assignee: Nippon Precision Circuits Inc. (JP)

( * ) Notice: Subject to any disclaimer, the term of this patent is extended or adjusted under 35 U.S.C. 154(b) by 999 days.

(21) Appl. No.: 10/861,217

(22) Filed: Jun. 4, 2004

(65) Prior Publication Data

US 2004/0263653 A1 Dec. 30, 2004

(30) Foreign Application Priority Data

Jun. 6, 2003 (JP) .............................. 2003-162792

(51) Int. Cl.
 *H04N 5/228* (2006.01)
 *H04N 3/14* (2006.01)
 *H04N 5/335* (2006.01)

(52) U.S. Cl. .................................. 348/222.1; 348/294

(58) Field of Classification Search ................ 348/294, 348/297, 222.1
 See application file for complete search history.

(56) References Cited

U.S. PATENT DOCUMENTS

| 4,186,301 A | 1/1980 | Basire et al. ................. 250/204 |
| 4,240,727 A | 12/1980 | Lermann et al. ............... 354/25 |
| 4,949,282 A * | 8/1990 | Muraoka ..................... 382/288 |
| 4,991,109 A * | 2/1991 | Crookshanks ............... 345/207 |
| 5,150,957 A | 9/1992 | Walker et al. ................ 358/347 |
| 5,161,140 A | 11/1992 | Terada ...................... 369/44.28 |
| 5,347,590 A | 9/1994 | Nonnweiler et al. ........... 382/6 |
| 5,450,146 A | 9/1995 | Chedeville et al. ............ 352/31 |
| 5,461,425 A * | 10/1995 | Fowler et al. ................ 348/294 |
| 5,852,491 A | 12/1998 | Kato ......................... 356/5.01 |
| 5,900,863 A | 5/1999 | Numazaki .................... 345/158 |
| 2001/0030690 A1 | 10/2001 | Ishikawa et al. ............ 348/159 |

OTHER PUBLICATIONS

"A Digital Vision Chip Specialized for High-Speed Target Tracking," T. Komuro et al., IEEE Transactions on Electron Devices, vol. 50, No. 1, Jan. 2003.

* cited by examiner

*Primary Examiner*—Tuan V Ho
*Assistant Examiner*—Chia-Wei A Chen
(74) *Attorney, Agent, or Firm*—Adams & Wilks

(57) ABSTRACT

An image detection processing device which executes the processing at a high speed using a circuit constitution of a small scale best suited for calculating the centroid of an object, the circuit being arranged on the same chip as the image detection processing device. The image detection processing device or a so-called vision chip includes a plurality of image detection processing elements, and comprises a shift register for converting serial data representing the total sum or a portion of the pixel data into a first parallel data, an adder which receives the converted parallel data and outputs a second parallel data representing a first-order moment, and a serial divider which receives the first and second parallel data and divides them to produce serial data representing the centroid coordinates, featuring a circuit constitution of a small scale and realizing a high-speed processing.

3 Claims, 17 Drawing Sheets

F I G. 3
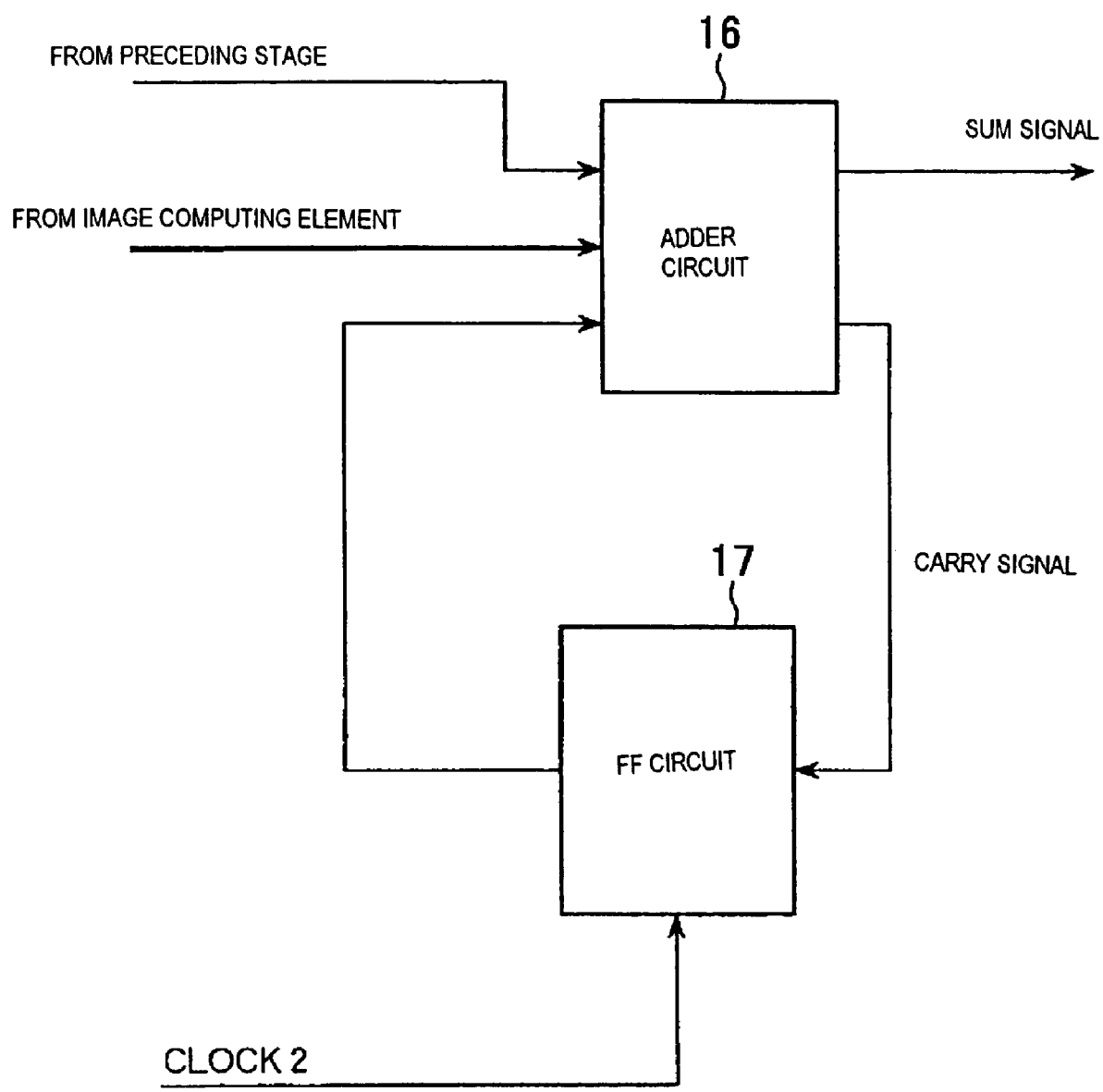

(a)

(b)

| INPUT | | OUTPUT | | | |
|---|---|---|---|---|---|
| DSEL 0 | DSEL 1 | CLEAR CLK | SHIFT CLK | ADD CLK | DIV CLK |
| 0 | 0 | CLKB | L | L | L |
| 0 | 1 | L | L | L | CLKB |
| 1 | 0 | L | L | CLKB | L |
| 1 | 1 | L | CLKB | L | L |

FIG. 6
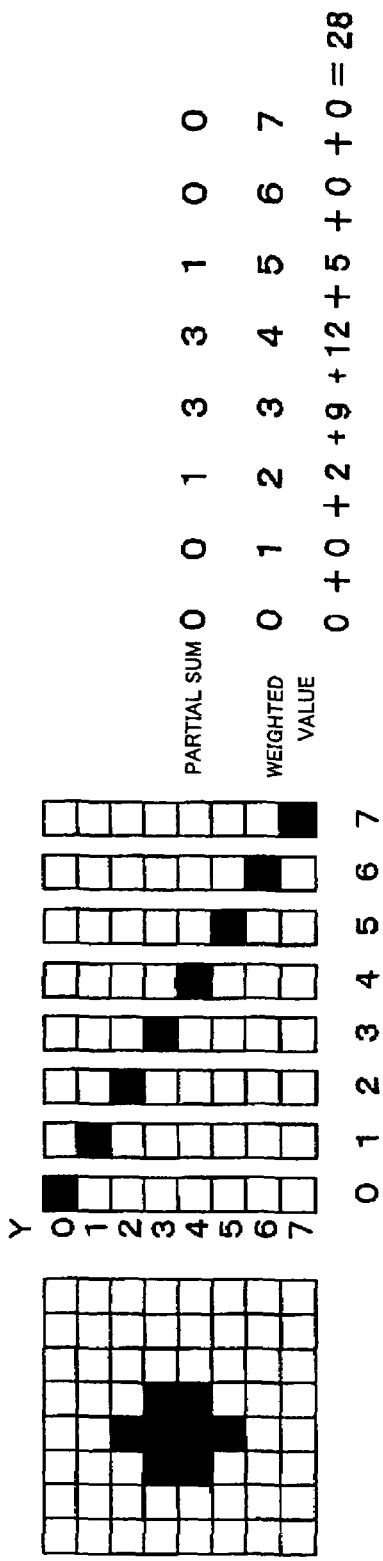
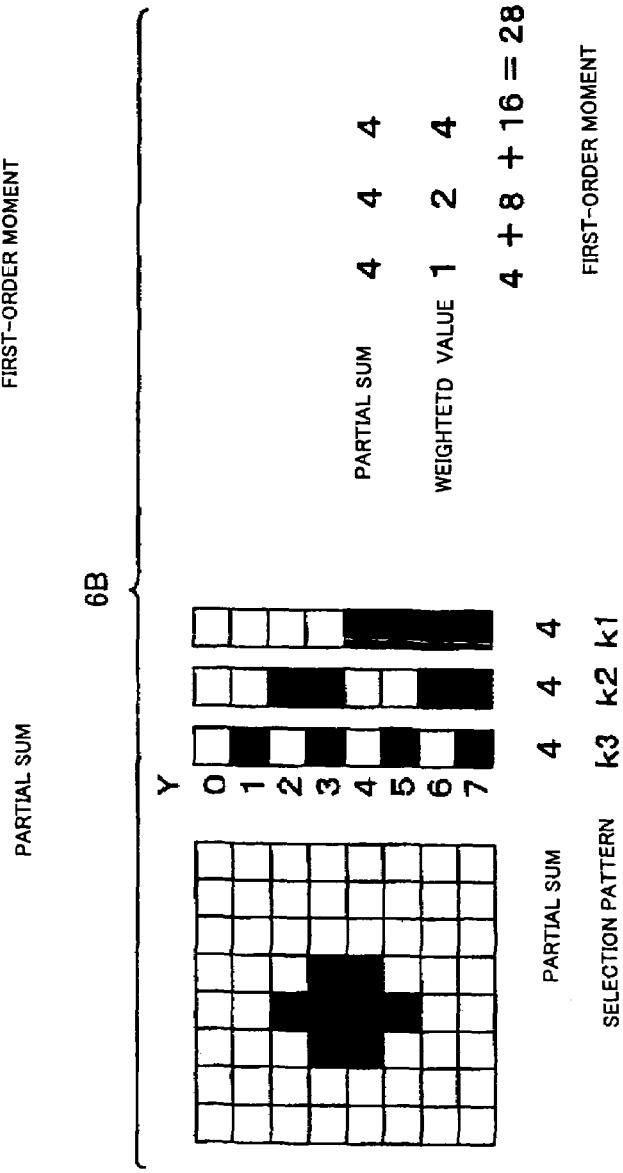

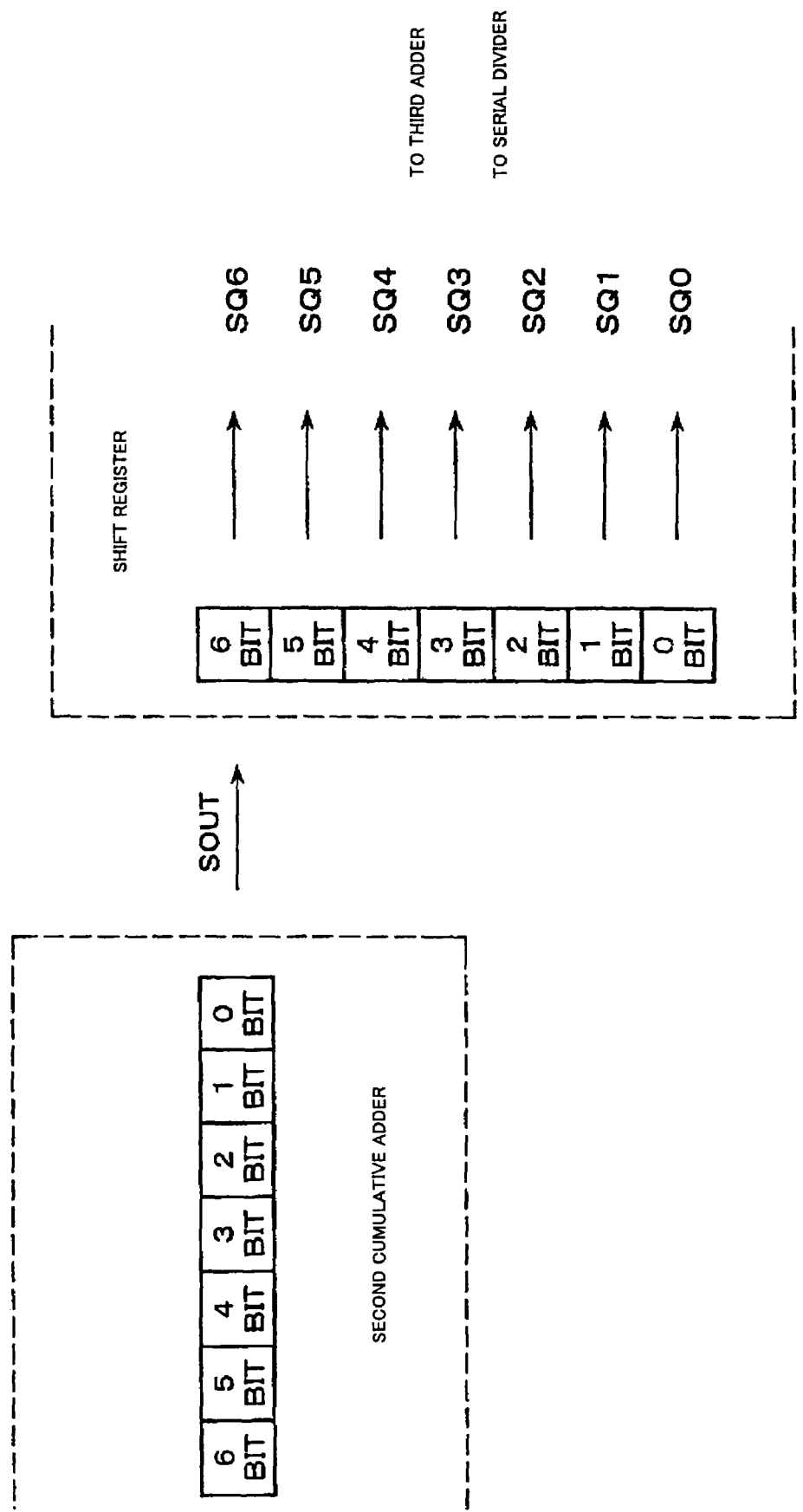

IMAGE DETECTION PROCESSING DEVICE FOR CALCULATING THE MOMENTS OF IMAGE DATA

BACKGROUND OF THE INVENTION

1. Field of the Invention

This invention relates to an image detection processing device used for a variety of control equipment, recognition devices and data input devices. More specifically, the invention relates to an image detection output device for processing the image of a moving object at a high speed.

2. Description of the Related Art

A CCD light sensor used for video cameras and an external processor have heretofore been used in combination as an image detection processing device for a variety of control equipment, recognition devices and data input devices. The image data obtained by the CCD light sensor are transferred to a memory and are stored therein, and the image processing is effected such as calculating the centroid of an object (target) via the processor. However, the conventional devices are accompanied by such defects that limitation is imposed on the signal transfer speed from the CCD light sensor and the external processor becomes large in scale.

An image processing device for effecting the image processing at a high speed eliminating the above defects has been taught in JP-A-2001-195564. In this image detection processing device, a plurality of image detection processing elements are arranged on a plane, each image detection processing element comprising a light detector for effecting the photoelectric conversion, a converter for converting signals from the light detector into digital signals, and an adder to which the digital signals can be input. There are further provided a cumulative adder formed by successively connecting the adders of the plurality of image detection processing elements, a control circuit for selectively inputting, to the cumulative adder, the digital signals from the plurality of image detection processing elements, and an output unit which receives process data output from the cumulative adder based on the image data detected by the light detector.

In this image detection processing device, digital signals of the plurality of image detection processing elements are selectively input to the cumulative adder by the control circuit, and the process data are output from the cumulative adder based on the image data detected by the light detectors in the image detection processing elements. Therefore, the image detection processing device forms the process data necessary for processing the image such as for calculating the centroid at the time of transferring the data making it possible to effect the processing at a high speed.

In order to calculate the coordinates of the centroid of the object (target) from the mage detection processing device, several process data from the output unit are added up and divided by using a separately provided memory and an arithmetic processing unit.

This image detection processing device is designed being aimed at effecting the processing at a high speed (e.g., calculates the centroid in a period of 1 ms), and must use an expensive arithmetic processing unit for effecting the addition and division at high speeds. It is also allowable to use an FPGA capable of mounting a divider. However, the FPGA itself is expensive and causes the circuit to become bulky.

SUMMARY OF THE INVENTION

It is an object of this invention to provide an image detection processing device which executes the processing at a high speed using separately provided arithmetic unit and FPGA which are inexpensively constructed, and which further has an operation function of an operation circuit constituted on a small scale best suited for calculating the centroid of an object, the operation circuit being arranged on the same chip as the image detection processing device.

According to one aspect of the invention, there is provided an image detection operation processing device having, arranged on a plane, a plurality of image detection processing elements each including a light detector for effecting the photoelectric conversion, a converter for converting the signals from the light detector into digital signals and an adder to which the digital signals can be input, the image detection operation processing device comprising:

a cumulative adder constituted by successively connecting the adders of the plurality of image detection processing elements;

a control circuit for selectively inputting the digital signals of the plurality of image detection processing elements to the cumulative adder;

a serial-parallel converter to which are input the process data output from the cumulative adder based on the image data detected by the light detectors;

an adder which adds up a plurality of first parallel data converted by the serial-parallel converter and outputs the added data as second parallel data; and a serial divider for dividing the second parallel data output from the adder and the first parallel data output from the serial-parallel converter.

In the image detection processing device of the invention, the serial divider divides the second parallel data obtained by adding up a plurality of first parallel data obtained by putting the process data to the serial-parallel conversion through the serial-parallel converter, and further divides the first parallel data output from the serial-parallel converter. Therefore, the zero-order moment and the first-order moment are formed therein as first and second parallel data from which the data related to the position of the centroid are operated and output. Therefore, no external circuit is required, and the centroid can be calculated at high speeds by using the image detection processing device only.

Further, use of the serial divider suppresses the circuit scale since only a simple circuit constitution is needed comprising flip-flops, subtraction circuits and multiplexers depending upon the digits of the second parameter data. Besides, since there have been known the total number of pixels in the image detection processing elements and a maximum number of digits of the data of maximum coordinates of the centroid, it is allowed to minimize the number of input digits of the serial-parallel converter concerned to operating the first and second parameter data, of the adder and of the serial divider and, hence, to constitute the circuit in a minimum scale. When the image detection processing device is formed in a single chip, in particular, a great advantage is obtained in suppressing an increase in the unnecessary chip area.

According to another aspect of the invention, there is provided an image detection operation processing device having, arranged on a plane, a plurality of image detection processing elements each including a light detector for effecting the photoelectric conversion, a converter for converting the signals from the light detector into digital signals and a first adder to which the digital signals can be input, the image detection operation processing device comprising:

a first cumulative adder constituted by connecting in series the first adders of the plurality of image detection processing elements for each of the rows;

a second cumulative adder constituted by connecting in series the second adders corresponding to each of the rows and for receiving the outputs of the final stages of the first cumulative adders of each of the rows, in order to cumulatively add up the outputs of the final stages of the first cumulative adders;

a control circuit for selectively inputting the digital signals of the plurality of image detection processing elements to the first cumulative-adders;

a serial-parallel converter to which are input the process data output from the second cumulative adder based on the image data detected by the light detectors;

a third adder which adds up a plurality of first parallel data converted by the serial-parallel converter and outputs the added data as second parallel data; and a serial divider for dividing the second parallel data output from the third adder and the first parallel data output from the serial-parallel converter.

The image detection operation processing device of this embodiment does not require any external circuit like the image detection operation processing device of the above first embodiment, and makes it possible to calculate the centroid at high speeds and to decrease the circuit scale.

It is desired that several combinations selected from the digital signals of the image detection processing elements are successively input to the first cumulative adders by the control circuit, the process data for each of the combinations output from the second cumulative adder are successively input to the serial-parallel converter to form first parallel data for each of the combinations, and the second parallel data obtained by adding up the first parallel data for each of the combinations while shifting them by a predetermined amount for each of the combinations through the third adder, are output as the first-order moment of the image focused on the group of image detection processing elements.

In this case, the first-order moment is calculated relying on a simple shift processing and addition making it possible to effect the processing of the coordinates of the centroid at high speeds and to decrease the scale of the circuit. Besides, provision of the constitution for producing the first-order moment makes it possible to offer the first-order moment to an external circuit at high speeds when a character quantity other than the coordinates of the centroid is to be operated by the external circuit, suppressing the load of operation exerted on the external circuit and executing the processing for operating the character quantity generally at an increased speed.

It is desired that:

several combinations selected from the digital signals of the image detection processing elements for each of the rows or columns are successively input to the first cumulative adders by the control circuit;

the processing data for each of the combinations output from the second cumulative adder are successively input to the serial-parallel converter to form first parallel data for each of the combinations; and to the serial divider, there are input:

a first-order moment of the image focused on a group of image detection processing elements represented by the second parallel data obtained by adding up the first parallel data for each of the combinations while shifting them by a predetermined amount for each of the combinations through the third adder; and a zero-order moment output from the serial-parallel converter by inputting all digital signals of the image detection processing elements to the first cumulative adders by the control circuit and by inputting the process data output from the second cumulative adder to the serial-parallel converter; and the serial divider divides the first-order moment by the zero-order moment, and operates and outputs the centroid coordinate data of the image focused on the group of image detection processing elements.

In this case, too, the first-order moment can be calculated relying on a simple shift processing and addition. Besides, the data related to the coordinates of the centroid are obtained relying on a simple shift processing and subtraction making it possible to effect the processing of the coordinates of the centroid at high speeds and to decrease the scale of the circuit.

It is desired that all elements are formed on a single chip. In this case, too, it is allowed to suppress an increase in the undesired chip area as described above.

BRIEF DESCRIPTION OF THE DRAWINGS

FIG. 3 is a diagram illustrating the constitution of a series adder of FIG. 1;

FIG. 6 is a diagram illustrating how to find a first-order moment;

FIG. 14 is a diagram illustrating the operation of the shift register;

DESCRIPTION OF THE PREFERRED EMBODIMENTS

Figure 1:
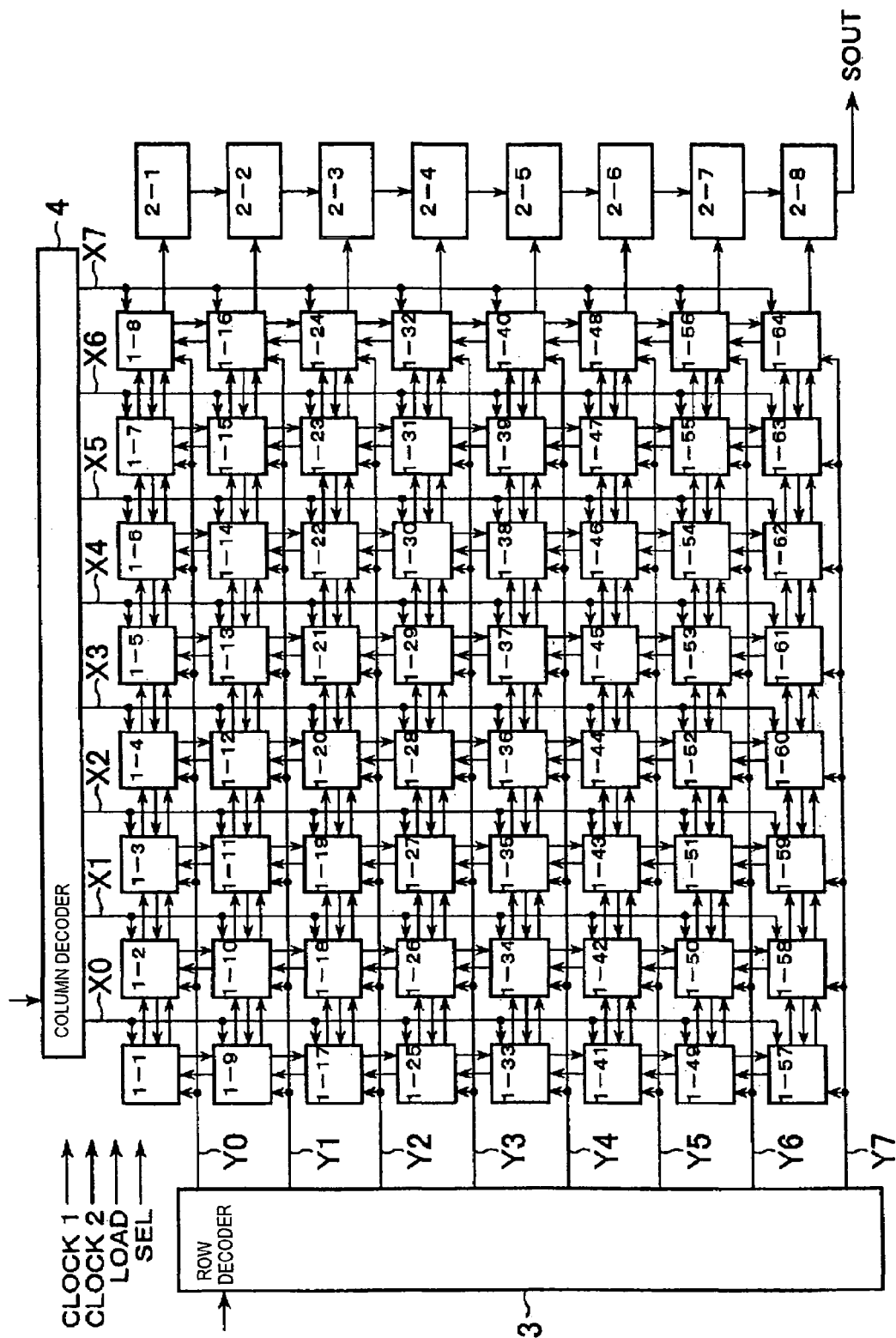
FIG. 1 is a plan view schematically illustrating an image detection processing device according to an embodiment of this invention.

An embodiment of the invention will now be described with reference to the drawings. FIG. 1 is a plan view schematically illustrating the image detection processing device according to an embodiment of the invention. In the image detection processing device of this embodiment, a visual sensor of a robot picks up the image of a target which is the moving object from the detected image, and processes the image data. In a subsequent stage, further, a zero-order moment and a first-order moment are calculated from the image data, and a processing is conducted to obtain position data and locus data.

In FIG. 1, reference numerals 1-1 to 1-64 are image detection processing elements forming an 8×8 array structure arranged on a plane. As will be described later, each image detection processing element includes a light detector, a conversion unit for converting signals from the light detector into digital signals, and a first adder. Each image detection processing element outputs digital signals as target image signals to the four image detection processing elements neighboring thereto up and down, and right and left. The image detection processing element forms a window image signal for picking up the target from the background based on a group of target image signals from the four image detection processing elements and its own target image signal. The image included in the window image is picked up as a new target image from the background.

The first adder of each pixel is connected to the first adder of the right neighboring image detection processing element. For example, the output of the first adder of the image detection processing element 1-11 is input to the first adder of the image detection processing element 1-12. Thus, the first adders in the image detection processing elements of each of the rows are successively connected to constitute first cumulative adders.

Signals CLOCK1, CLOCK2, LOAD and SEL are input as common signals to the image detection processing elements. The clock signal CLOCK1 and the signal LOAD are for receiving the image and for setting the initial image. The clock signal CLOCK2 and the signal SEL are for operating the image.

Reference numerals 2-1 to 2-8 are series adders which are the second adders arranged for each of the rows of the image detection processing elements and receive, through the inputs of one side thereof, the outputs from the corresponding image detection processing elements. Further, the outputs of the series adders are connected to the inputs on the other side of the series adders that are successively connected thereby to constitute a second cumulative adder circuit. The individual series adders will be described later with reference to FIG. 3.

In this embodiment, the series adder 2-1 corresponds to the image detection processing elements 1-1 to 1-8, and the output of the image detection processing element 1-8 is connected to the input on one side of the series adder 2-1. The output of the series adder 2-1 is connected to the input on the other side of the series adder 2-2. The output of the series adder 2-8 serves as the whole output signal, and an output unit is constituted so as to be served with the process data based on the image data detected by the light detectors.

In FIG. 1, reference numeral 3 denotes a row decoder circuit which controls output signals Y0 to Y7. Reference numeral 4 denotes a column decoder circuit which controls output signals X0 to X7. The first cumulative adders add and operate only those image detection processing elements selected by the row decoder 3 and the column decoder 4.

The second cumulative adder outputs the operated results serially and successively from the low-order digit.

Figure 2:
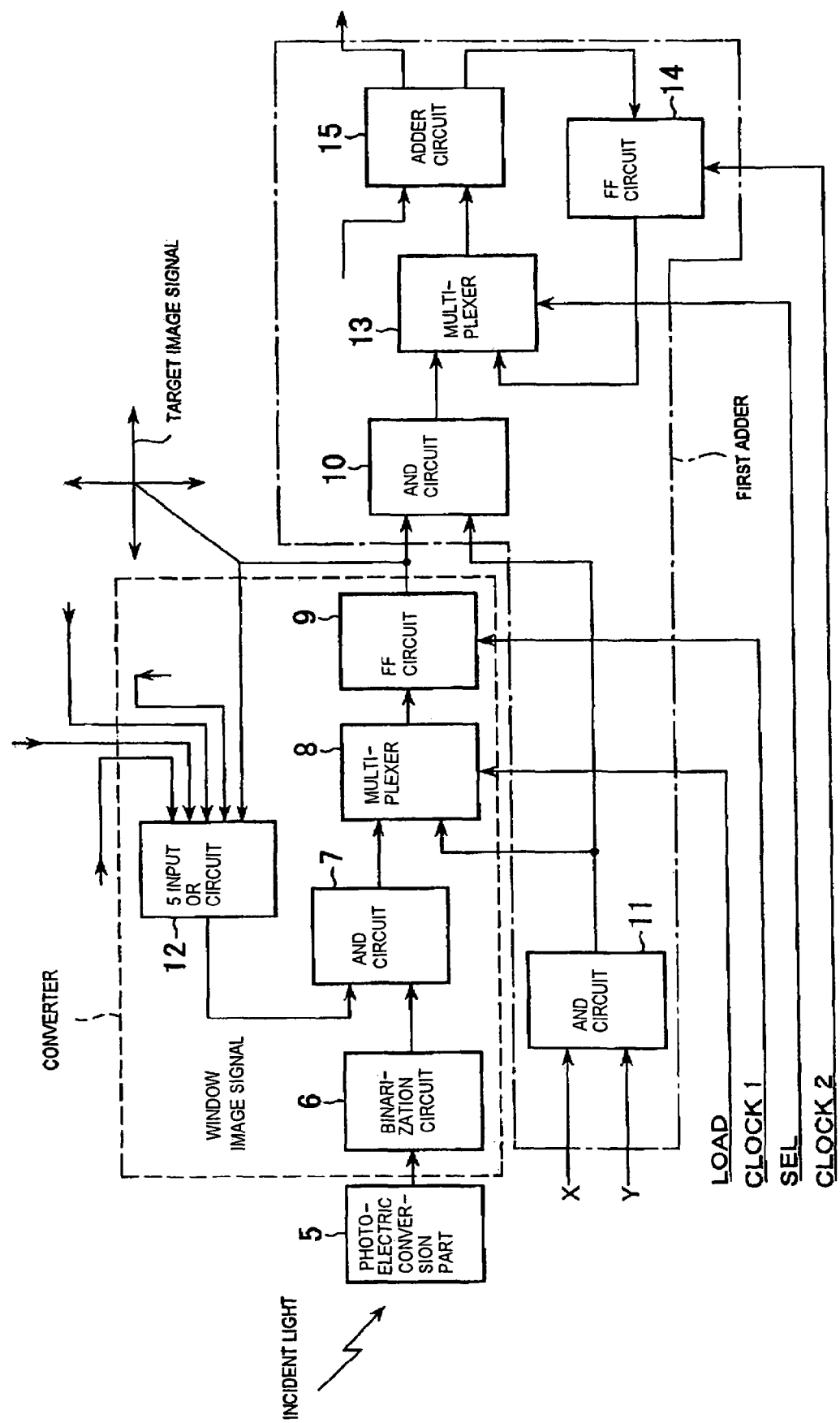
FIG. 2 is a diagram illustrating the constitution of an image detection processing element in FIG. 1.

The constitution of each image detection processing element will be described with reference to FIG. 2. Reference numeral 5 denotes a photoelectric conversion unit serving as a light detector and comprising a photodiode which produces a signal depending upon the intensity of light that is incident. Reference numeral 6 denotes a binary circuit which is a comparator and converts the signals from the photoelectric conversion unit 5 into a binary form. In this embodiment, the binary circuit 6 produces a signal depending upon the light quantity input to the photoelectric conversion unit 5, i.e., produces a signal of a high level: when the brightness is higher than a predetermined threshold value and produces a signal of a low level when the brightness is lower than the predetermined threshold value. Reference numeral 7 denotes an AND circuit which produces a signal of the high level when the signal from the binary circuit 6 and a signal from a 5-input OR circuit that will be described later are both of the high level. Reference numeral 8 denotes a multiplexer which permit the AND circuit to produce a signal when the signal LOAD of FIG. 1 is of the high level and permits an AND circuit 11 that will be described below to produce a signal when the signal LOAD of FIG. 1 is of the low level. Reference numeral 9 denotes a flip-flop circuit which receives a signal from the multiplexer 8 and outputs it in response to the clock signal CLOCK of FIG. 1. A converter is constituted by the binary circuit 6, AND circuit 7, multiplexer 8, flip-flop circuit 9 and 5-input OR circuit 12.

Reference numeral 10 denotes an AND circuit which produces a signal of the high level when the output of the flip-flop circuit 9 and the output of the AND circuit 11 that will be described below are both of the high level. Reference numeral 11 denotes the AND circuit which produces a signal of the high level when the output of the row decoder 3 and the output of the column decoder 4 are both of the high level. Reference numeral 12 denotes the 5-input OR circuit which produces an OR from the output of the flip-flop circuit 9 and from the outputs of the flip-flop circuits 9 of the upper, lower, right and left neighboring image detection processing elements.

Reference numeral 13 denotes a multiplexer which in this embodiment permits the AND circuit 10 to produce a signal when the signal SEL of FIG. 1 is of the high level and permits a flip-flop circuit 14 described below to produce a signal when the signal SEL is of the low level. Reference numeral 14 denotes the flip-flop circuit which receives and outputs a CARRY signal of an adder circuit 15 described below in response to the clock signal CLOCK2 of FIG. 1. Reference numeral 15 denotes an adder circuit comprising a half adder which calculates an arithmetic sum of the output of the multiplexer 13 and a SUM signal of a half adder circuit of the neighboring image detection processing element, and outputs the SUM signal and the CARRY signal. The first adder is constituted by the AND circuits 10, 11, multiplexer 13, flip-flop circuit 14 and adder circuit 15.

The series adder will be described next with reference to FIG. 3. Reference numeral 16 denotes an adder circuit constituted by a full adder which calculates an arithmetic addition of the SUM signal of the image detection processing element and the SUM signals of a flip-flop circuit 17 described below and of the adder circuit 16 of the preceding stage, and produces the SUM signal and the CARRY signal. The SUM signal is output to an adder circuit of the next stage, and the CARRY signal is output to the flip-flop circuit 17. The adder circuit 16 produces the SUM signal and the CARRY signal which are both of the low level when the three inputs are all of the low level, produces the SUM signal of the high level and the CARRY signal of the low level when any one of the three inputs is of the high level, produces the SUM signal of the low level and the CARRY signal of the high level when two of the three inputs have the high level, and produces the SUM signal and the CARRY signal which are both of the high level when the three inputs are all of the high level. Reference numeral 17 denotes the flip-flop circuit which receives and outputs the CARRY signal of the adder circuit 16 in response to the clock signal CLOCK2.

Figure 4:
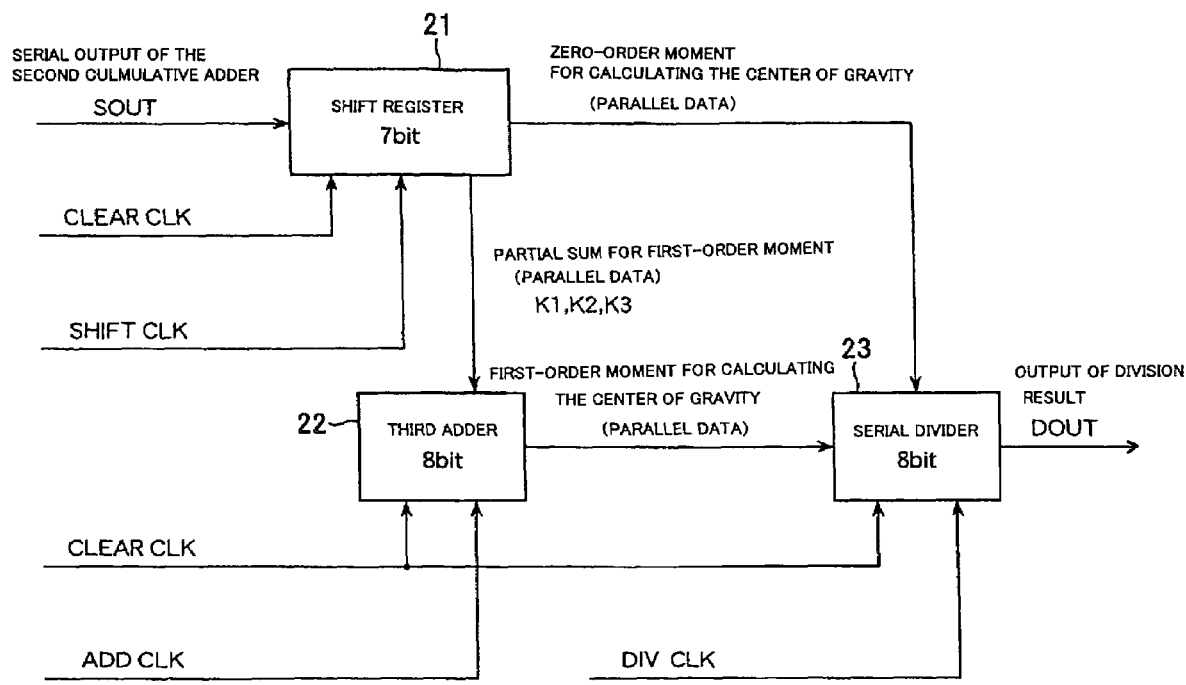
FIG. 4 is a diagram illustrating a circuit for operating the centroid in the image detection processing device.

FIG. 4 is a diagram illustrating a centroid operation circuit according to the embodiment of the invention. The centroid operation circuit operates the centroid position of the focused image from the output of the second cumulative adder. In FIG. 4, reference numeral 21 denotes a shift register having a memory of digits of a maximum total sum of the image detection processing elements. A serial output SOUT of the second cumulative adder (FIG. 1) is connected to the shift register 21 and is converted into parallel data. The parallel output of the shift register 21 is connected to a third adder 22 and to a serial divider 23 maintaining a bit width of the memory in the shift register 21. Namely, though the details will be described later, the outputs of the D-flip-flops which are the memories constituting the shift register 21 are connected to the third adder 22 and to the serial divider 23 in parallel.

Figure 5:
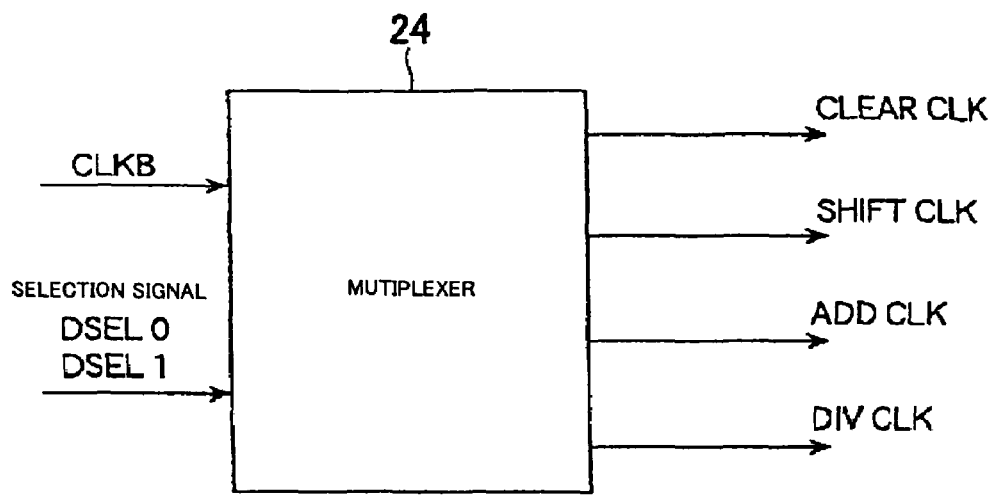
FIG. 5 is a diagram illustrating a multiplexer and a decoding table therefor.

FIG. 5A illustrates a selection circuit (multiplexer) 24 for selecting clocks (instructions) fed to the shift register 21, third adder 22 and serial divider 23 in FIG. 4. The multiplexer 24 receives clocks CLKB and selection signals DSEL0, DESEL1, and produces a clear clock CLEAR CLK, a shift clock SHIFT CLK, an addition clock ADD CLK and a division clock DIV CLK. The clock CLKB corresponds to the clock signal CLOCK2 of FIG. 1. The clear clock CLEAR CLK is output to the shift register 21, to the third adder 22 and to the serial divider 23. The shift clock SHIFT CLK is output to the shift register 21, the addition clock AD CLK is output to the third adder 22, and the division clock DIV CLK is output to the serial divider 23.

FIG. 5B is a table for decoding the input signals and output signals of the multiplexer 24. The operation of the multiplexer will be described later.

The third adder 22 calculates a first-order moment by adding up the partial sums of the first-order moments of several patterns put to the parallel conversion through the shift register 21, and outputs it as parallel data to the serial divider 23.

The serial divider 23 divides the first-order moment from the third adder 22 by the zero-order moment from the shift register 21, and outputs the operated results to an external unit starting with the high-order digit successively and serially.

Described below are the numbers of bits of the shift register 21, third adder 22 and serial divider 23. In the embodiment of the 8×8 array structure illustrated in FIG. 1 as will be described later, a maximum zero-order moment (total sum) of the image detection processing elements has 7 bits, and the first-order moment thereof has 8 bits. Therefore, the shift register 21 is constituted by a memory of 7 bits, and the third adder 22 and the serial divider 23 are constituted by memories of 8 bits.

Next, the operation of the image detection processing device will be described. The constitution illustrated in FIGS. 1 to 3 is the same as that of the image detection processing device illustrated in FIGS. 1 to 3 of JP-A-2001-195564. As for details of the operation of the stages preceding the series adder 2-8, therefore, reference should be made to JP-A-2001-195564. In order to initialize the internal circuit, first, the row decoder 3 and the column decoder 4 are all so set as will not to be selected, the pixel selection signals are output from the multiplexer 13 in response to the signal SEL, a clock signal CLOCK2 is input, and the latch circuits 14 and 17 are cleared. The latch circuit 14 is cleared by a clock signal CLOCK2 and, then, the latch circuits 17 are all cleared after 6 or more clocks are input thereto.

Next, the window image signals are set. The window image signals are for separating the target image from the background. The image selection signal is output from the multiplexer 8 in response to the signal LOAD, and suitable pixels are selected by the row decoder 3 and by the column decoder 4 to initially set the window image.

Next, the image is received. By using a suitable optical focusing systems the image of an object is focused on the image detection processing elements arranged on a plane. In each image detection processing element, the photoelectric conversion unit 5 converts the brightness data of the object into an analog signal depending upon the light quantity of image that is focused. The analog signal is converted through the binary circuit 6 into a binary image signal having either the low level or the high level.

The AND circuit 7 puts the binary image signal to the AND operation with the window image signal to obtain a target image signal. The target image signal is output to the flip-flop 9 through the multiplexer 8, and is received at a timing of the clock signal CLOCK1. The target image signal received by the flip-flop 9 is input to the 5-input OR circuit 12 for forming a window signal at a timing of the next clock signal CLOCK1.

The output of the flip-flop 9 is output to the 5-input OR circuit 12 in the same image detection processing element, and is further output to the 5-input OR circuits 12 in the neighboring four image detection processing elements, and window image signals are output from the 5-input OR circuits 12. The window image is expanded toward the up and down, and toward the right and left relative to the initial binary image. A target image is obtained by effecting the AND operation between the window image and the binary image in the next frame. That is, the window image is formed being slightly expanded following the motion of the target image signal for each of the frames, and the image included therein is obtained as a new target image signal.

Next, described below is the operation for arithmetically operating the image. First, the total number of pixels constituting the target image can be regarded to be the area (zero-order moment) of the target image. For the comprehension of the basic operation of the image detection operation processing device of FIG. 1, the operation will now be briefly described for finding the zero-order moment. Here, the image detection processing elements are all selected by the row decoder 3 and by the column decoder 4. The target image signal output from the flip-flop 9 is input to the multiplexer 13 only when the pixel selection signal formed by the AND circuit 10 is of the high level. The signal SEL of the high level is produced so that the output of the AND circuit 10 is selected by the multiplexer 13. Therefore, the signal of the high level or the low level determined depending upon the target image is input to the half adder 15 of each image detection processing element and is added to the SUM signal from the left neighboring image detection processing element of FIG. 1. The resulting SUM signal is output to the half adder 15 of the right neighboring image detection processing element. Here, in each row, the added result of the SUM signal is asynchronously transferred up to the image detection processing elements 1-8, 1-16, - - - , 1-64 at the right ends. Further, the CARRY signal which is the added result is output to its own flip-flop 14 and is received by the flip-flop 14 at a timing of a subsequent clock signal CLOCK2. Next, the signal SEL of the low level is produced so that the output of the flip-flop 14 is selected by the multiplexer 13. The output of the flip-flop 14 is added to the SUM signal from the left neighboring image detection processing element through the half adder 15, and the resulting SUM signal is output to the half adder 15 of the right neighboring image detection processing element in the same manner as above. A CARRY signal which is the added result is output to its own flip-flop 14. Here, the image detection processing elements 1-8, 1-16, - - - , 1-64 at the right ends output the SUM signals to the series adders 2-1 to 2-8.

The series adders 2-1 to 2-8 add up the SUM signals from the image detection processing elements 1-8, 1-16, - - -, 1-64 at the right ends, the SUM signals of the adder circuits in the series adders of the preceding stages and the CARRY signals, and produce the SUM signals and CARRY signals. The CARRY signals are output to their own flip-flops 17 and are received at a timing of the clock signal CLOCK2.

The SUM signals of the adder circuits in the series adders 1-8 to 1-64 are successively output to the series adders of the subsequent stages at a timing of the clock signal CLOCK2. At a timing of the first clock signal CLOCK2, the series adder 2-8 produces a value of the lowest-order digit of when the total number of pixels constituting the target image is expressed by a binary number. Every time when the clock signal CLOCK2 is input, the total number of pixels constituting the target image is successively output starting with the lowest-order digit. In this embodiment, the clock signal CLOCK2 is input in a number of 7 after the SEL signal is input, so that the total number of pixels constituting the target image is obtained in a binary number of 7 digits. In this embodiment, the total number of pixels constituting the target mage is found as serial data, i.e., the area (zero-order moment) of the target image is found as serial data with a small number of clocks.

Next, briefly described below is the operation for finding the first-order moment. To find the first-order moment, suitable pixels are selected by the row decoder 3 and by the column decoder 4 to find several kinds of partial sums, and the total sum of the partial sums is calculated. This is illustrated in FIG. 6. In FIG. 6A, the figure on the left side is an image that becomes the object. The figure at the center is a selection pattern of the column decoder, and the figure on the right side is a value of the corresponding partial sum. Here, the longitudinal direction of the array of image detection processing elements is represented by the Y-axis, the coordinate positions are represented by 0, 1, - - -, 7 from the upper side, the transverse direction is represented by the X-axis, and the coordinate positions are represented by 0, 1, - - -, 7 from the left. The first-order moments of the X-axis and Y-axis are represented by the total sums of the sums in their respective axial directions multiplied by the values of coordinate positions as weighted values. To find the first-order moment in the Y-axis direction, for example, the total number of pixels constituting the target image is found by selecting the lowermost columns only in setting the row decoder 3, and the obtained value is multiplied by 7. Next, the total number is found while selecting the second columns from the lower side. In the same manner, the partial sums are successively added for each of the columns while being multiplied by a coefficient of the weighted value to obtain a value of the fist-order moment.

FIG. 6B illustrates a selection pattern of the column decoder according to the embodiment of the invention and values of partial sums corresponding thereto. In FIG. 6B, the figure on the left side is an image that becomes the object. The central figure is a selection pattern of the column decoder according to the embodiment of the invention, and the figure on the right side is a value of a partial sum corresponding thereto. The embodiment of this invention is based on the technology disclosed in JP-A-2001-195564 according to which the row decoder is set by designating at one time the columns corresponding to the Y-axis coordinate positions 7, 5, 3, 1 to find the sum of pixels constituting the target image included therein, which is, then, multiplied by a weighted value 1, by designating at one time the columns corresponding to the Y-axis coordinate positions 7, 6, 3, 2 to find the sum of pixels constituting the target image included therein, which is, then, multiplied by a weighted value 2 and, then, by designating at one time the columns corresponding to the Y-axis coordinate positions 7, 6, 5, 4 to find the sum of pixels constituting the target image included therein, which is, then, multiplied by a weighted value 4 to find the first-order moment. Then, the first-order moment can be calculated by calculating the partial sums three times.

The first-order moment in the direction of X-axis can be similarly calculated by similarly setting the row decoder 4. The coordinate of the centroid can be easily found by dividing the obtained first-order moment by the area (zero-order moment).

According to this embodiment, the image detection processing apparatus is capable of forming process data necessary for processing the image such as calculating the centroid and is further capable of operating the centroid using the centroid operation circuit to process the image at high speeds.

Next, the operation for processing the moment will be mathematically described in the method of calculating the coordinates of object centroid.

The size of the image is determined by the image detection processing elements of a number of $N^2$ ($N=2^n$). The gray scale of the image data is $M=2^m$. The image data of an image detection processing element at a coordinate position x on the X-axis and at a coordinate position y on the Y-axis, is denoted by I(x, y). The execution time is represented by a number of clocks at the image detection processing element (clock signals CLOCK2 in this embodiment). The zero-order moment is expressed as follows:

$$m_{00} = \sum_{k=1}^{n} \sum_{k=1}^{n} I(x, y) \quad (1)$$

This is the total sum of the image data, and the required number of bits is $\log_2$ (maximum output value) and, hence, $\log_2(N^2(M-1)) \cong (2n+m)$. In this embodiment, the gray scale is 2, the number of the image detection processing elements is 64 and, hence, 7 bits are required.

The first-order moment is expressed as given below, $m_{10}$ being the first-order moment in the direction of row and $m_{01}$ being the first-order moment in the direction of column.

$$m_{10} = \sum_{x=1}^{n} \sum_{y=1}^{n} xI(x, y)$$

$$m_{01} = \sum_{x=1}^{n} \sum_{y=1}^{n} yI(x, y)$$

This embodiment calculates the first-order and higher-order moments at increased speeds owing to the function of operating the total sum by obtaining the AND of the selection pattern and the data in the image detection processing elements (i.e., function for selecting the image detection processing elements) and by expanding the weighted value into a bit plane (expanding with a binary number).

If the binary expression of x is $x_n x_{n-1} \ldots x_1$, then, $$x = \sum_{k=1}^{n} x_k 2^{k-1}$$

The first-order moment can be expressed as follows:

$$m_{10} = \sum_{x=1}^{n}\sum_{y=1}^{n} xI(x,y) = \sum_{k=1}^{n} 2^{k-1} \sum_{x=1}^{n}\sum_{y=1}^{n} xI(x,y) = \sum_{k=1}^{n} 2^{k-1} s_k \quad (2)$$

Here, $s_k$ is obtained by taking the AND of the selection pattern shown in FIG. 6B and the data of each image detection processing element. The selection pattern shown in FIG. 6B corresponds to k=1, k=2, k=3 from the right.

The centroid coordinate (x bar, y bar) is found as given below from the zero-order moment (total sum) $m_{00}$ and the first-order moments $m_{10}$, $m_{01}$ of the tracking image, $m_{10}$ being the first-order moment in the direction of row and $m_{01}$ being the first-order moment in the direction of column.

$\bar{x} = m_{10}/m_{00}$ $\bar{y} = m_{01}/m_{00}$ (3)

The divider mounted on the image detection processing device is capable of producing digits smaller than a decimal point, and its validity will now be described.

The image detection processing device is used chiefly for obtaining the centroid coordinate data of the object. When the integer term only of the divider is used as the centroid data, the range of centroid coordinates does not exceed the number of the image detection processing elements.

Figure 7:
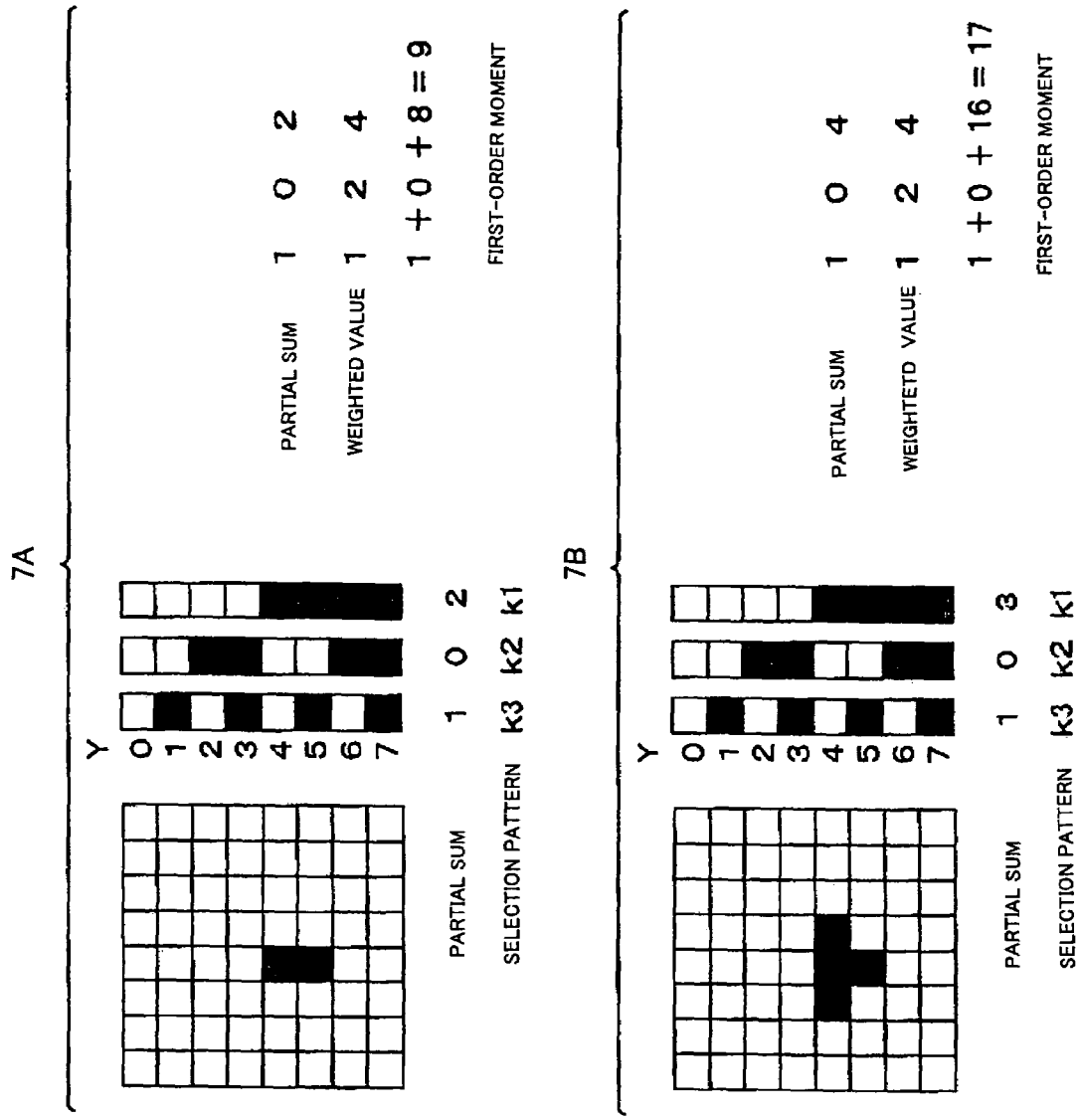
FIG. 7 is a diagram illustrating the effective digits of the centroid coordinate.

FIG. 7 is a diagram illustrating the effective digits of centroid coordinates. The example of FIG. 7 deals with the centroid coordinate y bar in the longitudinal direction. The same holds for the centroid coordinate x bar in the transverse direction, too. FIG. 7A is when the object is recognized by two pixels in the image detection processing device. In this case, the centroid coordinate data y bar becomes $\bar{y} = m_{01}/m_{00} = 9/2 = 4.5$ and the centroid coordinate data is located midway between the fourth pixel and the fifth pixel. When the real number term only is used by cutting off decimal fractions, however, the centroid coordinate data is at the fourth pixel.

FIG. 7B illustrates another example. This is a case where the object is recognized by the four pixels. Like in FIG. 7A, the centroid coordinate data y bar is, $\bar{y} = m_{01}/m_{00} = 17/4 = 4.25$ and the centroid coordinate data lies between the fourth pixel and the fifth pixel, i.e., at a position advanced by a quarter from the fourth pixel toward the fifth pixel. When the integer term only is used by cutting off decimal fractions, however, the centroid coordinate data is at the fourth pixel.

In practice, the decimal fractions are not infinitely valid but an inverse number of the area of the object or larger becomes valid. In FIG. 7A, for example, the object area includes two pixels. Therefore, the decimal fractions of up to 0.5 pixels become valid but the smaller decimal fractions are not valid. In FIG. 7B, similarly, the object area includes four pixels, and the decimal fractions of up to 0.25 pixels become valid.

In the array structure of 8×8 image detection processing elements of FIG. 1, the object area includes a maximum of 64 pixels, and the centroid coordinate possesses 3 valid digits of an integer term in binary notation and 6 decimal digits.

The decimal digits are effective in improving the resolution of the object coordinates particularly when the image detection processing device has a small number of image detection processing elements.

Figure 8:
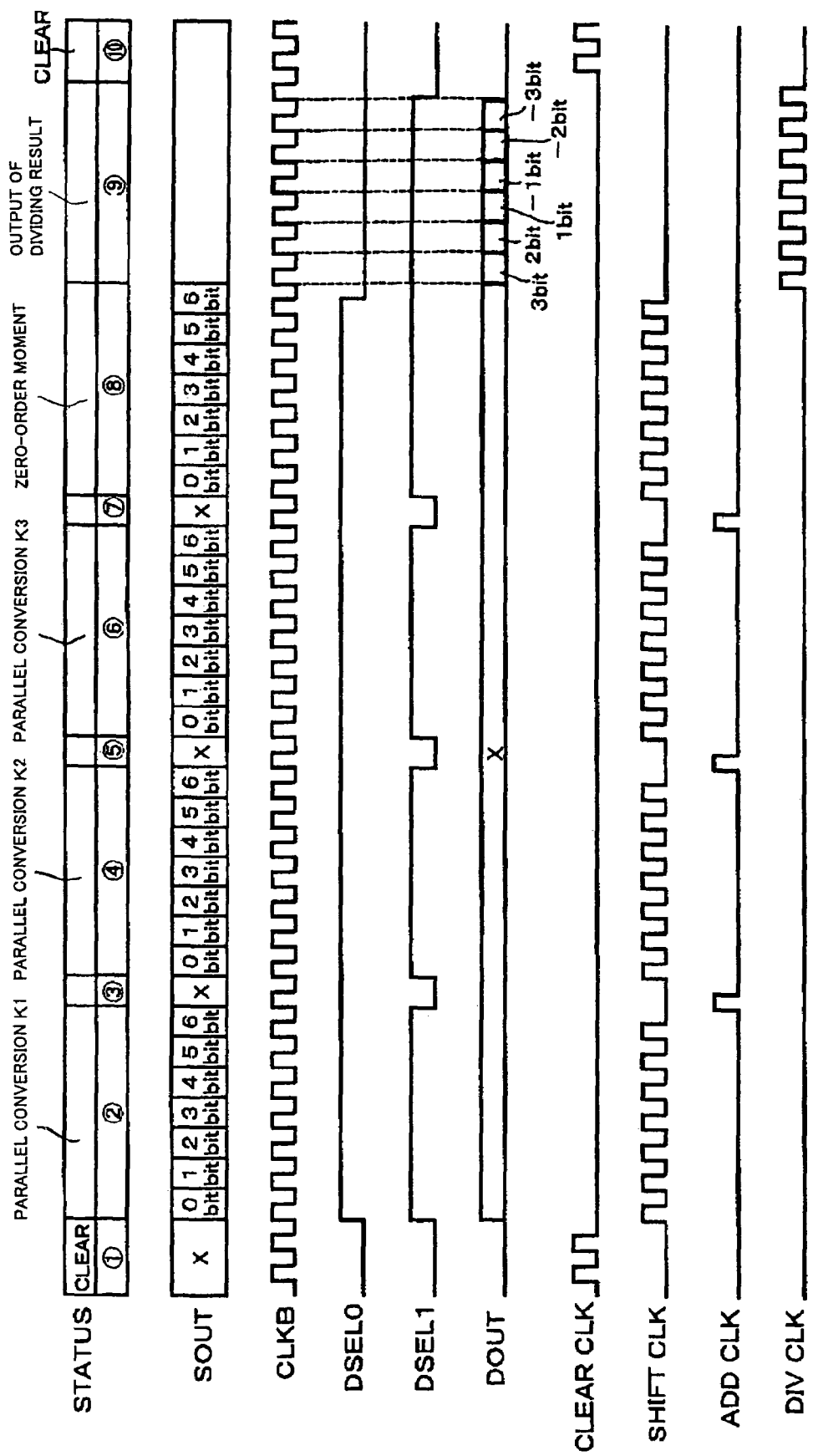
FIG. 8 is a timing chart illustrating the operation for calculating centroid coordinates.

FIG. 8 is a timing chart illustrating the operation for arithmetically operating the centroid coordinates according to the embodiment of the invention. Described below with reference to FIG. 8 is the procedure for calculating the centroid coordinates of the object (target) to explain the operation of the 8×8 pixel constitution of FIG. 1 in detail. The function for selecting the image detection processing elements and the operations of the first cumulative adders and of the second cumulative adder were described above already.

To calculate the centroid coordinate data, the partial sums of the first-order moment (selection patterns are k1, k2, k3 in FIG. 6B) are calculated three times and the zero-order moment (total sum) is calculated one time by the first cumulative adder and by the second cumulative adder. In the 8×8 pixel constitution illustrated in FIG. 1, the total sum of pixels has a maximum value of 7 bits.

Figure 9:
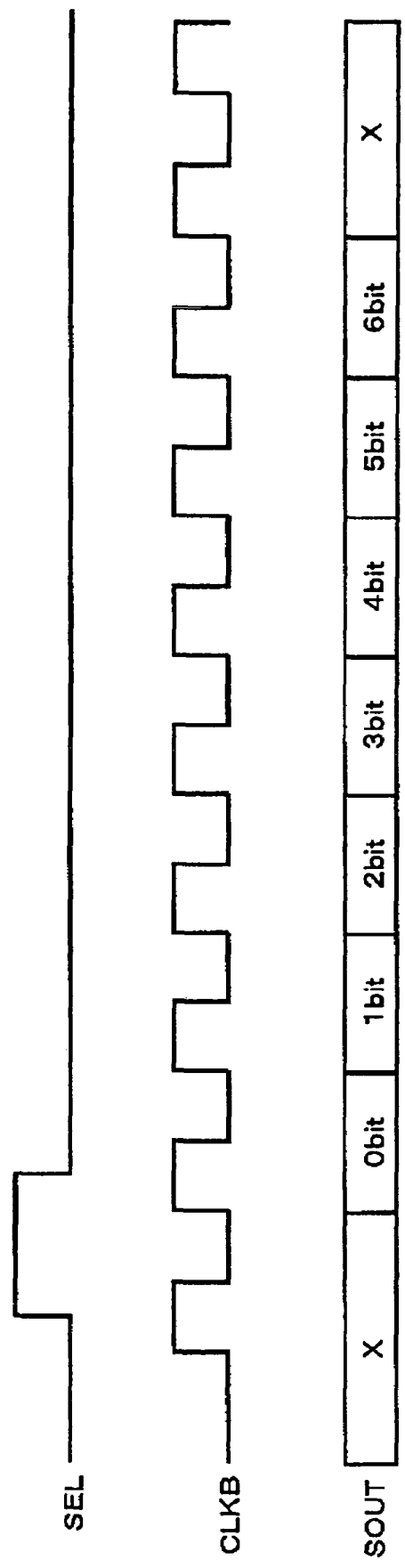
FIG. 9 is a timing chart for outputting the data of a second cumulative adder.

FIG. 9 illustrates the output waveforms of the second cumulative adder or, in other words, the output waveforms from the series adder 2-8. In FIG. 9, the signal CLKB is a clock signal CLOCK2 of the second cumulative adder, and the signal SEL is a pulse for operating the image of the second cumulative adder. The second cumulative adder starts operating in response to the above two signals and serially produces SOUT bit by bit starting with the low-order digit of the operated result in synchronism with the rising edge of CLKB. The operation of the second cumulative adder of FIG. 1 is shifted in synchronism with the rising edge of CLKB, and the operation of the centroid operation circuit illustrated in FIG. 4 is shifted in synchronism with the breaking edge of CLKB.

In FIG. 5A as described above, reference numeral 24 denotes a selection circuit (multiplexer) for selecting clocks (instructions) given to the shift register 21, third adder 22 and serial divider 23 in FIG. 4. FIG. 5B is a decoding table therefor. By giving selection signals DSEL0, DSEL1 and control clock CLKB to the selection circuit 24, the state is so controlled as to reset all of the shift register 21, the third adder 22 and the serial divider 23, or to bit-shift the shift register 21, to execute the third adder 22 or to execute the serial divider 23.

Operations of the shift resister 21, third adder 22 and serial divider 23 will now be described.

(1) Clear the Whole Memories.

First, the memories in the shift register 21, third adder 22 and serial divider 23 are cleared to "0" by setting DSEL0 and DSEL1 to be both of the low level (state (1) in FIG. 8) and by generating a clear clock CLEAR CLK. Concretely speaking, the memories are the D-flip-flops D-FF00 to D-FF06 in the shift register 21 in FIG. 11, the D-flip-flops D-FF10 to D-FF17 in the third adder 22 in FIG. 12, and the D-flip-flops D-FF20 to D-FF28 and D-FF30 in the serial divider 23 in FIGS. 13A and 13B.

When both DSEL0 and DSEL1 are rendered to be of the low level (state (1) in FIG. 8), the clear clocks CLEAR CLK are simultaneously added to all memories in the shift register 21, third adder 22 and serial divider 23.

(2) Shift Register: Selection Pattern k1 (Partial Sum of the First-Order Moment).

After the memories are all cleared, DSEL0 and DSEL1 both assume the high level (state (2) in FIG. 8) and stand by in this state.

In the state (2), the shift register 21 continues to convert the serial outputs of the second cumulative adder into parallel outputs in synchronism with the breaking edge of the SHIFT CLK which is in synchronism with the CLKB. Here, the image detection processing elements corresponding to the selection pattern k1 (FIG. 6) are selected, and an addition operation start signal SEL is given to the first cumulative adder, so that the serial data of the result of cumulative addition (partial sum k1 of the first-order moment) is output from the second cumulative adder to the shift register 21 starting with the lowest-order bit. After a maximum value of 7 bits of the second cumulative adder is received by the shift register 21, the DSEL1 only is rendered to assume the low level before the CLKB rises next ((3) in FIG. 8).

(3) Third Adder: Selection Pattern k1 (Partial Sum of the First-Order Moment).

In the state (3) of FIG. 8, only one clock ADD CLK is generated, and the third adder 22 adds up 7 bits of the shift register 21 and the data of the third adder 22. In the case of this selection pattern k1, the memory in the third adder 22 has been cleared and, hence, the value of the shift register 21 is stored in the third adder 22.

(4) Shift Register: Selection Pattern k2 (Partial Sum of the First-Order Moment).

After the third adder 22 has effected the addition, both DSEL0 and DSEL1 are rendered to assume the high level (state (4) in FIG. 8) and stand by.

A selection pattern k2 is selected from the image detection processing elements like when the partial sum of the first-order moment of the selection pattern k1 was calculated, the addition operation start signal SEL is given to the first cumulative adder and to the second cumulative adder, and a partial sum k2 of the first-order moment is output as the result of cumulative addition from the second cumulative adder to the shift register 21. After the maximum value of 7 bits of the second cumulative adder is received by the shift register 21, the DSEL1 is rendered to assume the low level before the CLKB rises next ((5) in FIG. 8).

(5) Third Adder: Selection Pattern k2 (Partial Sum of the First-Order Moment).

In the state (5) of FIG. 8, only one clock ADD CLK is generated, and the third adder 22 adds up 7 bits of the shift register 21 and the data of the third adder 22. At this moment, the data of the selection pattern k1 stored in the third adder 22 is shifted up by one bit to possess 8 bits, and a value with its lowest-order bit being "0" and 7 bits of the shift register 21 are added up together. Based on this operation, the formula (2) is executed. Namely, "2" is given out of the weighted value "4" for the data of the pixels of the selection pattern k1.

(6) Shift Register: Selection Pattern k3 (Partial Sum of the First-Order Moment).

After the third adder 22 has effected the addition, both DSEL0 and DSEL1 are rendered to assume the high level (state (6) in FIG. 8) and stand by.

A selection pattern k3 is selected from the image detection processing elements like when the partial sum of the first-order moment of the selection pattern k2 was calculated, the addition operation start signal SEL is given to the first cumulative adder and to the second cumulative adder, and a result of the cumulative addition (partial sum k3 of the first-order moment) is output from the second cumulative adder to the shift register 21. After the maximum value of 7 bits of the second cumulative adder is received by the shift register 21, the DSEL1 is rendered to assume the low level before the CLKB rises next ((7) in FIG. 8).

(7) Third Adder: Selection Pattern k3 (Partial Sum of the First-Order Moment).

In the state (7) of FIG. 8, only one clock ADD CLK is generated, and the third adder 22 adds up 7 bits of the shift register 21 and the data of the third adder 22. At this moment, the data stored in the third adder 22 is shifted up by one bit, and a value with its lowest-order bit being "0" and 7 bits of the shift register are added up together. Based on this operation, the formula (2) is executed. Namely, the weighted value is set to be "4" for the data of the pixels of the selection pattern k1 the weighted value "2" is given for the data of the pixels of the selection pattern k2, and the weighted value "1" is given for the data of the pixels of the selection pattern k3, which are, then, added up to obtain a first-order moment.

(8) Shift Register: Selection Pattern, all Pixels (Zero-Order Moment).

After the third adder 22 has effected the addition, both DSEL0 and DSEL1 are rendered to assume the high level (state (8) in FIG. 8) and stand by.

All pixels of the image detection processing elements are selected, the addition operation start signal SEL is given to the first cumulative adder and to the second cumulative adder, and a result of the cumulative addition (zero-order moment) is output from the second cumulative adder. After the maximum value of 7 bits of the second cumulative adder is received by the shift register, the DSEL0 is rendered to assume the low level and the DSEL1 is rendered to assume the high level before the CLKB rises next ((9) in FIG. 8).

(9) Calculation of Centroid Coordinates: Division.

After the DSEL0 is rendered to assume the low level and the DSEL1 the high level ((9) in FIG. 8), the serial divider 23 divides the first-order moment from the third adder 22 by the zero-order moment from the shift register 21, and outputs the operated results to an external unit successively and serially staring with the high-order digit. The serial divider 23 specializes the calculation of the centroid coordinates of the object (target) from the image detection processing device.

Figure 10:
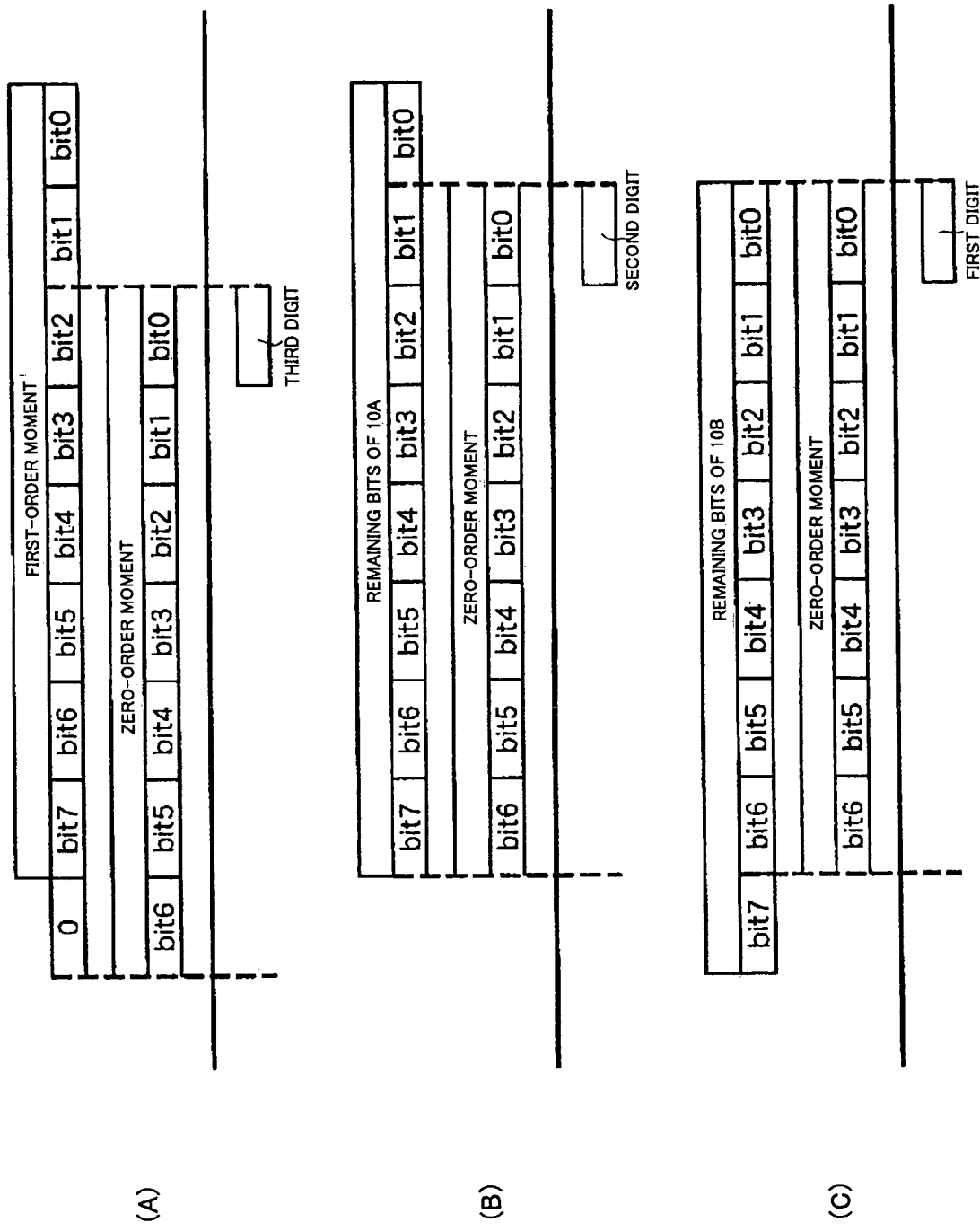
FIG. 10 is a diagram illustrating the operation of a serial divider.
Figure 13A:
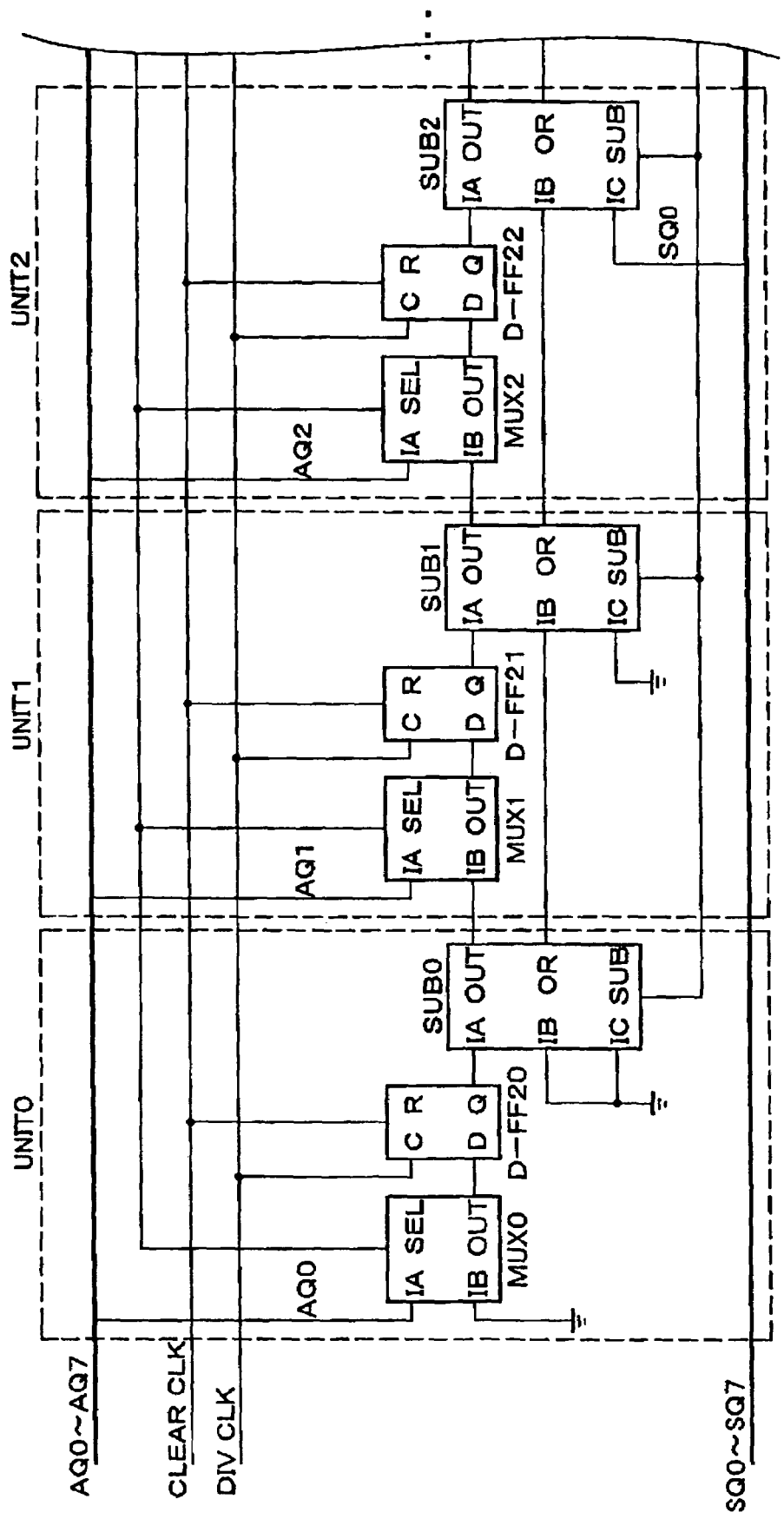
FIG. 13A is a diagram illustrating the left half of the circuit of a serial divider according to the embodiment of the invention.
Figure 13B:
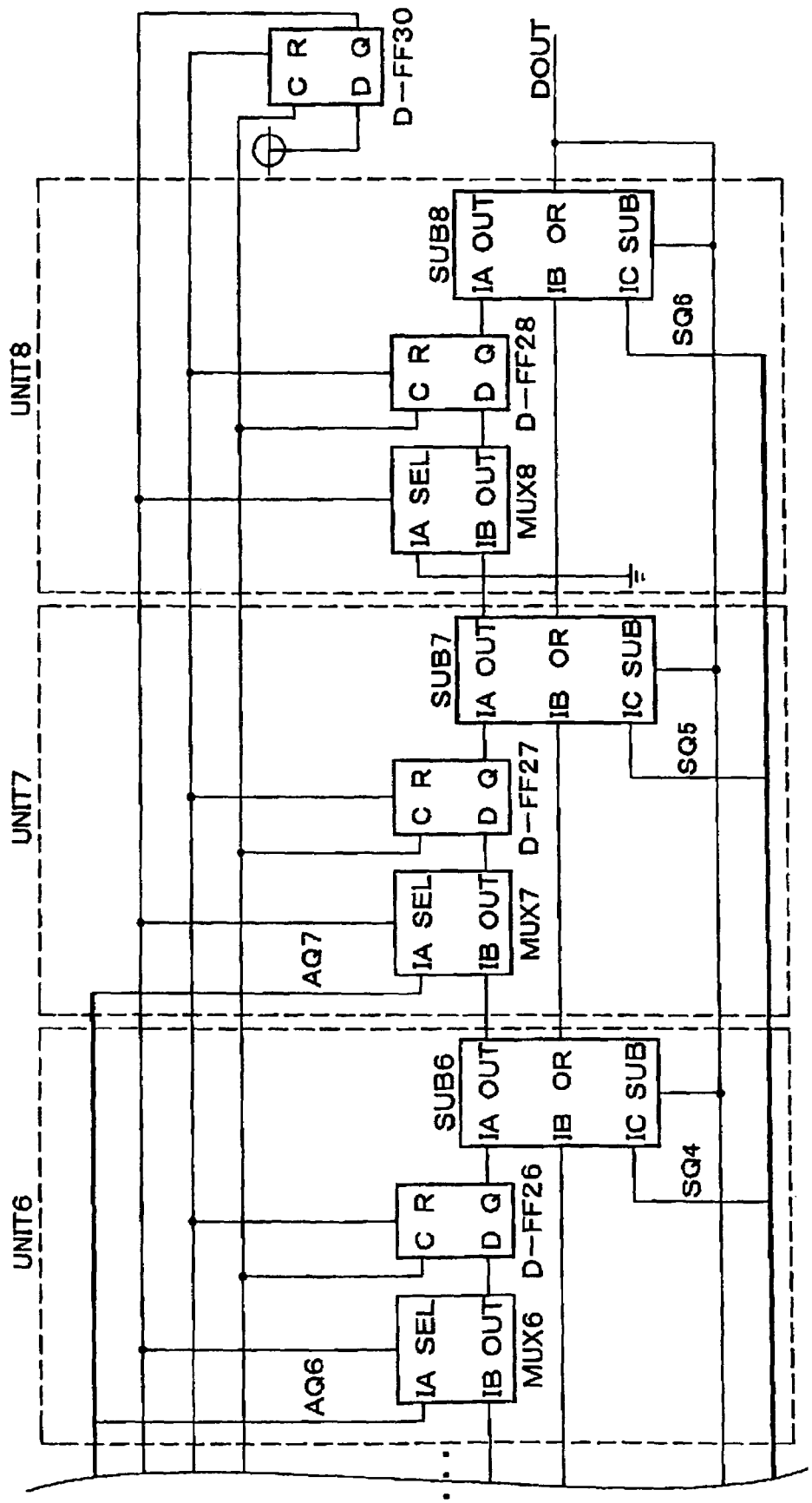
FIG. 13B is a diagram illustrating the right half of the circuit of the serial divider according to the embodiment of the invention.

FIG. 10 schematically illustrates a concrete method of division. FIGS. 10A to 10C illustrate a shift in synchronism with the break of a division clock DIV CLK. As will be described later in detail, the serial divider 23 is constituted, as illustrated in FIGS. 13A and 13B, by ten D-flip-flops D-FF20 to D-FF28 and D-FF30 forming a memory with a shift function, by nine subtractors SUB0 to SUB8 and by nine multiplexers MUXO to MUX8.

After DSEL0 is rendered to assume the low level and DSEL1 the high level ((9) in FIG. 8) through the centroid coordinate calculation of (9), the first-order moment is loaded from the third adder 22 onto the memory of the serial divider 23 due to the break of the first DIV CLK. In this state as shown in FIG. 10A, the second bit (bit 2) from the lowest position through up to the highest bit (bit 7) of the first-order moment of 8 bits are compared with the lowest position (bit 0) through up to the highest bit (bit 6) of the zero-order moment of 7 bits for their magnitudes. If the zero-order moment is smaller than the high-order bit of the first-order moment, then, the operated result of "1" is output to the division output DOUT. If not, "0" is output to the division output DOUT. This value is the third binary digit which is the greatest digit in the centroid coordinate of this embodiment.

The state shifts from FIG. 10A to FIG. 10B in synchronism with the break of the division clock DIV CLK. Here, if the operated result of FIG. 10A is "1" (subtraction was possible), a Value obtained by subtracting the zero-order moment from the first-order moment is shifted up by one digit and is newly stored in the memory in the serial divider 23. If the operated result of FIG. 10A is "0", the value of the first-order moment is shifted up by one digit. Concretely speaking, if the operated result is "1" in FIG. 10A, then, bit 5 through bit 0 of the zero-order moment are subtracted from bit 7 through bit 2 of the first-order moment, respectively, the results are shifted so as to serve as the remaining bit 7 through bit 2 of FIG. 10A shown in FIG. 10B, and a bit 1 of the first-order moment is put to the lower position thereof. This value is compared with the zero-order moment for their magnitudes. If the zero-order moment can be subtracted from the value stored in the serial divider 23, "0" is output as the operated result to the division output DOUT. If it cannot be subtracted, then, "0" is output as the operated result to the division output DOUT. This value is a second binary digit representing the centroid coordinates. Similarly, the division clock DIV CLK is repetitively given to calculate all digits.

That is, the first-order moment is compared with the zero-order moment for their magnitudes from the high-order digit successively in synchronism with the division clocks DIV CLK. If the zero-order moment is greater, the first-order moment side is shifted upward by one digit. If the zero-order moment is smaller, a value obtained by subtracting the zero-order moment from the first-order moment is shifted up by one digit. This operation is repeated to realize the division. FIG. 8 illustrates a state of finding from 3 bit through up to −3 bits, i.e., finding 3 digits of integers down to a decimal third digit. By further giving division clocks DIV CLK to the divider 23, however, further lower decimal digits can be obtained.

Next, described below is a method of constituting the centroid operation circuit of FIG. 4 in a minimum circuit scale by using the shift register 21, third adder 22 and serial divider 23 of the embodiment.

(1) Shift Register.

Figure 11:
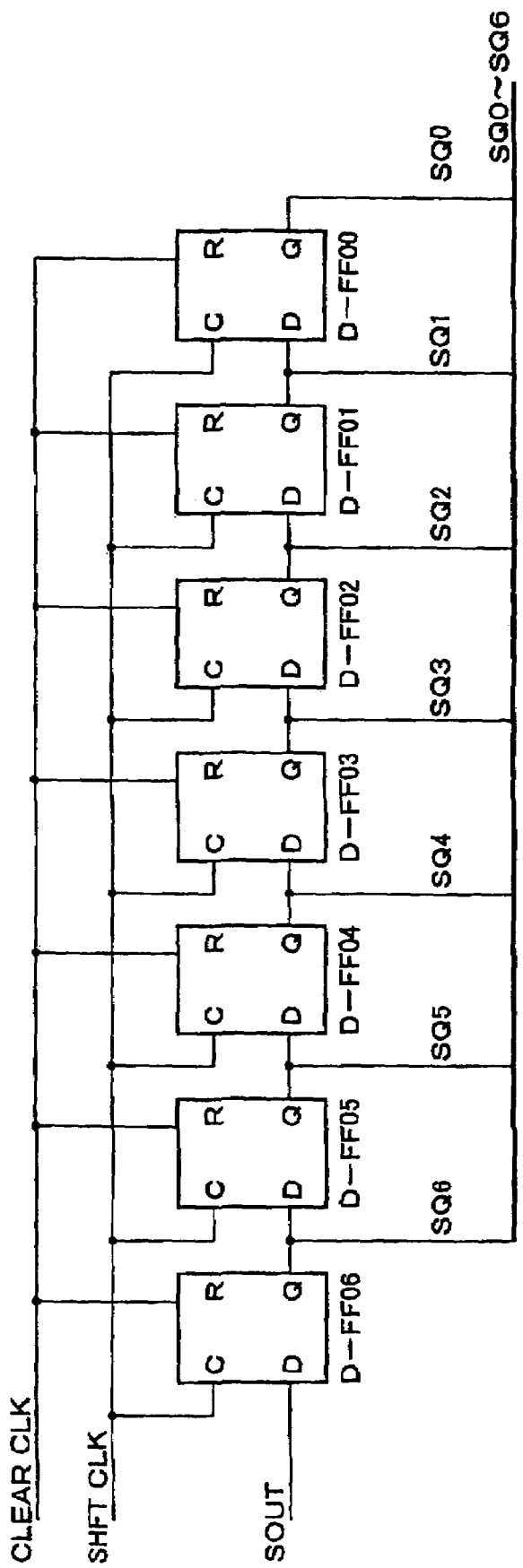
FIG. 11 is a circuit diagram of a shift register according to an embodiment of the invention.

FIG. 11 is a diagram illustrating an embodiment of the shift register 21. The shift register 21 illustrated in FIG. 11 has D-flip-flops (D-FF00 to D-FF06) which are memories in a number equal to: a maximum bit number of the zero-order moment, wherein the output terminals (Q in the drawing) of the D-flip-flops are serially connected to the input terminals (D in the drawing) of the succeeding flip-flops, and the serial output SOUT of process data from the second cumulative adder of FIG. 1 is connected to the input terminal (D in the drawing) of the D-flip-flop D-FF06 at the head (left end in the drawing). The SHIT CLK of FIG. 5A is input to all clock terminals (C in the drawing) of the D-flip-flops D-FF00 to D-FF06, and CLEAR CLK of FIG. 5A is input to all reset terminals (R in the drawing) thereof.

The operation of the shift register 21 is such that the process data SOUT from the second cumulative adder input to the input terminal (D in the drawing) of the D-flip-flop D-FF06, are shifted seven times bit by bit from the D-flip-flop D-FF06 to the D-flip-flop D-FF05, from the D-flip-flop D-FF05 to the D-flip-flop D-FF04 and so on up to the D-flip-flop DFF00 in synchronism with the operation clocks SHIT CLK of D-flip-flops. When the shift clocks are input 8 times or more, the bits input earlier are discarded, and new 7 bits are held at all times. The highest-order through up to the lowest-order bits of the first parallel data held in the D-flip-flops D-FF00 to D-FF06 are output from the output terminals SQ6 to SQ0 which are connected to the third adder 22 and to the serial divider 23. FIG. 14 illustrates the operation of the shift register 21.

(2) Third Adder.

Figure 12:
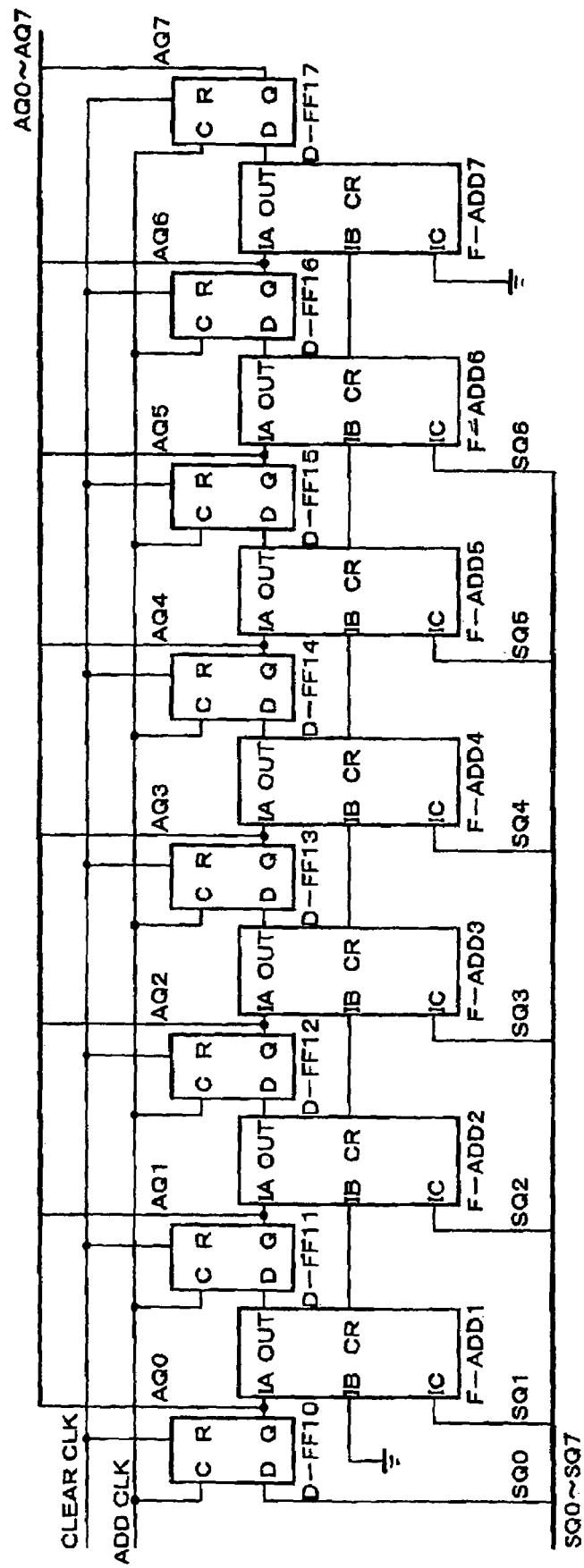
FIG. 12 is a circuit diagram of a third adder according to the embodiment of the invention.

FIG. 12 illustrates an embodiment of the third adder 22. The third adder 22 includes full adders F-ADD in a number equal to a maximum bit number of the first-order moment minus one, and includes D-flip-flops which are memories in a number equal to a maximum bit number of the first-order moment. The output terminals (Q in the drawing) of the D-flip-flops D-FF10 to D-FF16 are connected to the first input terminals (IA in the drawing) of the full adders F-ADD1 to F-ADD7. The output terminals (OUT in the drawing) of the full adders F-ADD1 to F-ADD7 are connected to the input terminals (D in the drawing) of the D-flip-fops D-FF11 to D-FF17, and the input terminal (D in the drawing) of the D-flip-flop D-FF10 at the head only is connected to the output terminal SQO of the shift register 21. The second input terminals (IB in the drawing) of the full adders F-ADD2 to F-ADD7 are connected to the CARRY outputs (CR in the drawing) of the full adders F-ADD0 to F-ADD6 of the preceding stages, and the second input terminal of F-ADD1 only is maintained at the low level at all times. The third input terminals (IC in the drawing) of the full adders F-ADD1 to F-ADD6 are connected to the output terminals SQ1 to SQ6 of the shift register 21. The third input terminal of the full adder F-ADD7 only is maintained at the low level at all times. ADD CLK of FIG. 5A is input to all clock terminals (C in the drawing) of the D-flip-flops D-FF10 to D-FF17 and CLEAR CLK is input to all reset terminals (R in the drawing) thereof. The first-order moment found by the third adder 22 is output from the output terminals AQ0 to AQ7 of the D-flip-flops D-FF10 to D-FF17 which are connected to the divider 23.

The operation of the third adder 22 is such that the full adders F-ADD1 to F-ADD7 add up the outputs of the output terminals SQ1 to SQ6 of the shift register 21 and the outputs of the D-flip-flops D-FF10 to D-FF1, the added output is shifted up by one bit in synchronism with the operation clock ADD CLK of the D-flip-flops D-FF, and is picked up by the D-flip-flops D-FF11 to D-FF17. That is, the first parameter data from the shift register 21 are added up and shifted up (twice) repetitively by the number of times of the operation clocks ADD CLK to operate the first-order moment, and the process data of the first-order moment outputs AQ0 to AQ7 are output to the serial divider 23.

The operation of the third adder 22 will now be described in line with the timing chart of FIG. 8. In the state (3) of FIG. 8, the contents of the D-flip-flops D-FF10 to D-FF16 of the preceding stages have been cleared up. Therefore, the full adders F-ADD1 to F-ADD6 work to add a value "0" to the data of the output terminals SQ1 to SQ6. In other words, the data of the output terminals SQ1 to SQ6 are output to the D-flip-flops D-FF11 to D-FF16 without substantially effecting the addition. Here, if a clock ADD CLK is generated, the data of the output terminals SQ0 to SQ6 are stored in the D-flip-flops D-FF10 to D-FF16, respectively. At this moment, the content of the D-flip-flop D-FF17 stores a value "0".

Next, in the state (5) of FIG. 8, the full adders F-ADD1 to F-ADD6 add up the data of the lowest-order bit to a bit one bit lower than the highest-order bit of the selection pattern k1 stored in the D-flip-flops D-FF10 to D-FF15 of the preceding stages and the data of a bit higher than the lowest-order bit by one bit through up to the highest-order bit of the selection pattern k2 newly output from the output terminals SQ1 to SQ6, and sends them to the D-flip-flops D-FF11 to D-FF16. Here, if a clock ADD CLK is generated, the D-flip-flops D-FF10 to D-FF17 store the data of bits obtained by adding up a value that is obtained by shifting up the data of the selection pattern k1 by one bit so as to possess 8 bits and of which the lowest-order bit is "0" and 7 bits of the shift register 21.

Figure 15:
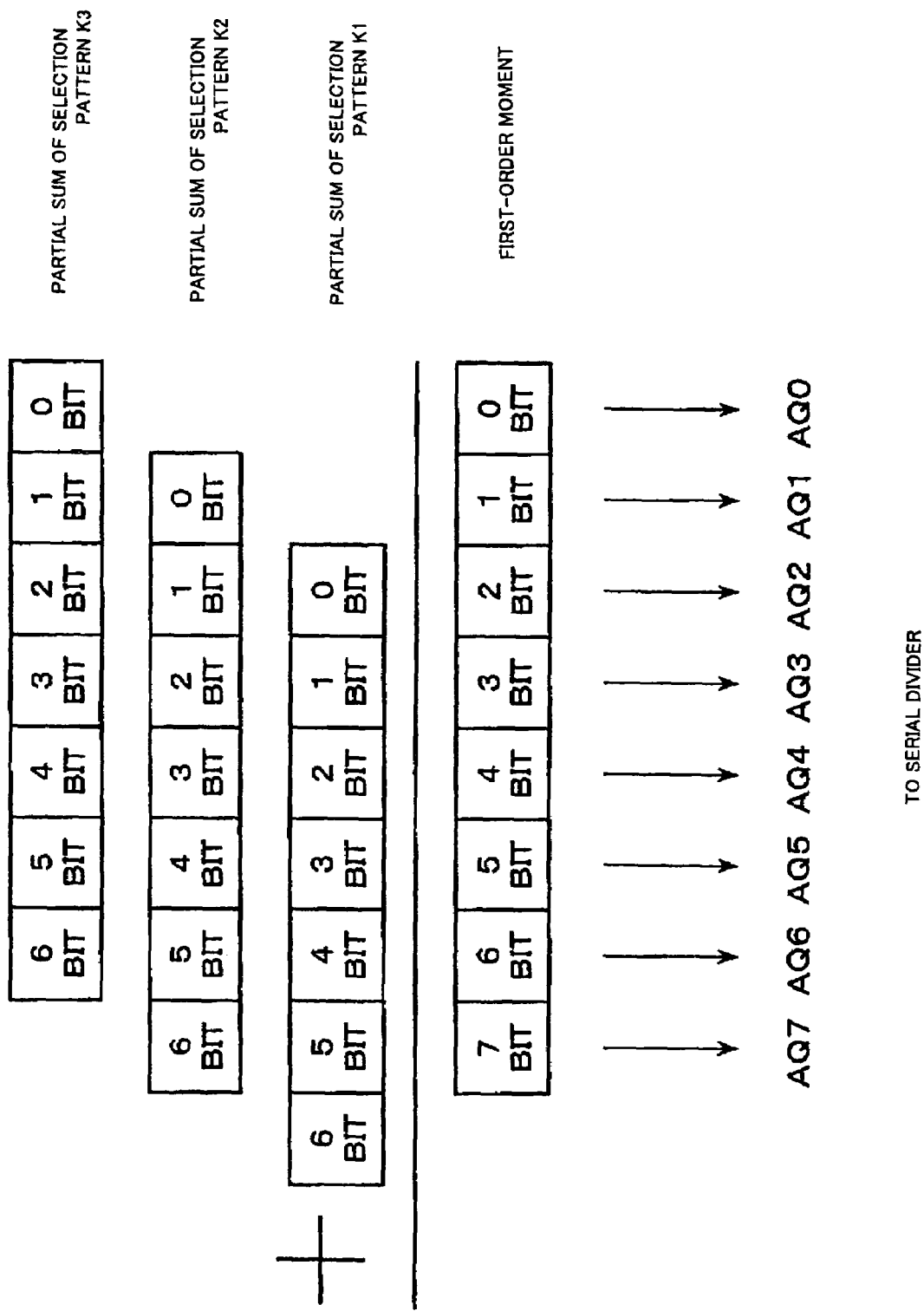
FIG. 15 is a diagram illustrating the operation of the third adder.

Next, in the state (7) of FIG. 8 like in the above operation, the full adders F-ADD1 to F-ADD6 add up the data of the lowest-order bit through up to a bit one bit lower than the highest-order bit which are the results added in (5) in FIG. 8 and stored in the D-flip-flops D-FF10 to D-FF15 of the preceding stages and the data of a bit one bit higher than the lowest-order bit through up to the highest-order bit of a selection pattern k3 newly output from the output terminals SQ1 to SQ6, and outputs them to the D-flip-flops D-FF11 to D-FF16. Here, if a clock ADD CLK is generated, the D-flip-flops D-FF10 to D-FF17 store the data of eight bits of from the lowest-order bit to the highest-order bit obtained by the addition of 9 bits which are those of the data of the selection pattern k1 shifted up by 2 bits, 8 bits which are those of the data of the selection pattern k2 shifted up by one bit, and 7 bits of the selection pattern k3. This realizes the operation of the third adder 22 illustrated in FIG. 15. The partial sums for the first-order moment selected by the selection patterns k1, k2 and k3 are received, each having 7 bits, from the shift register and, if ordinarily considered, could form data of 9 bits. As will be understood from the selection patterns, however, the partial sums of the first-order moment do not exceed the one-half of the zero-order moment of when the pixels are all selected. Therefore, a maximum value of the partial sums does no exceed 6 bits, and there is no effect of overflow caused by 9 bits.

(3) Serial Divider.

FIGS. 13A and 13B illustrate an embodiment of the serial divider 23, FIG. 13A illustrating the left half of the serial divider 23 and FIG. 13B illustrating the right half thereof. The serial divider 23 includes subtractors SUB with a multiplexer, 2-input 1-output multiplexers MUX, and memories D-FF in a number equal to a maximum number of bits of the first-order moment plus one. Though FIGS. 13A and 13B do not illustrate-repeating portions, UNIT2 to UNIT7 all have the same circuit constitution. Output terminals AQ0 to AQ7 for producing the first-order moment from the third adder are connected to the input terminals (IA in the drawing) of the multiplexers MUX0 to MUX7, and output terminals (OUT in the drawing) of the subtractors SUB of the preceding stages are connected to the input terminals (IB in the drawing) on the other side thereof. Either the terminals IA or IB are selected as the output terminals (OUT in the drawing) of the multiplexer by the selection terminals (SEL in the drawing), the output terminals (OUT in the drawing) being connected to the input terminals (D in the drawing) of the D-flip-flops D-FF20 to D-FF28 which are the memories. Here, the input terminals IA of the subtractors SUB0 to SUB8 are connected to the output terminals Q of the D-flip-flops D-FF20 to D-FF28. The input terminal IB of the subtractor SUB0 is grounded to be "0" at all times, and the input terminals IB of the subtractors SUB1 to SUB8 are connected to the CARRY terminals CR of: the preceding stages. The input terminals IC of the subtractors SUB0 and SUB1 are grounded to be "0" at all times, and the input terminals IC of the subtractors SUB2 to SUB8 are connected to the output terminals SQ0 to SQ6 of the shift register 21 so as to receive zero-order moment from the shift register 21. The DIV CLK of FIG. 5A is input to all clock terminals (C in the drawing) of the D-flip-flops D-FF20 to D-FF28 and D-FF30, and CLEAR CLK of FIG. 5A is input to all reset terminals (R in the drawing) thereof. The centroid coordinate data DOUT found by the serial divider are output to an external circuit.

Figure 16:
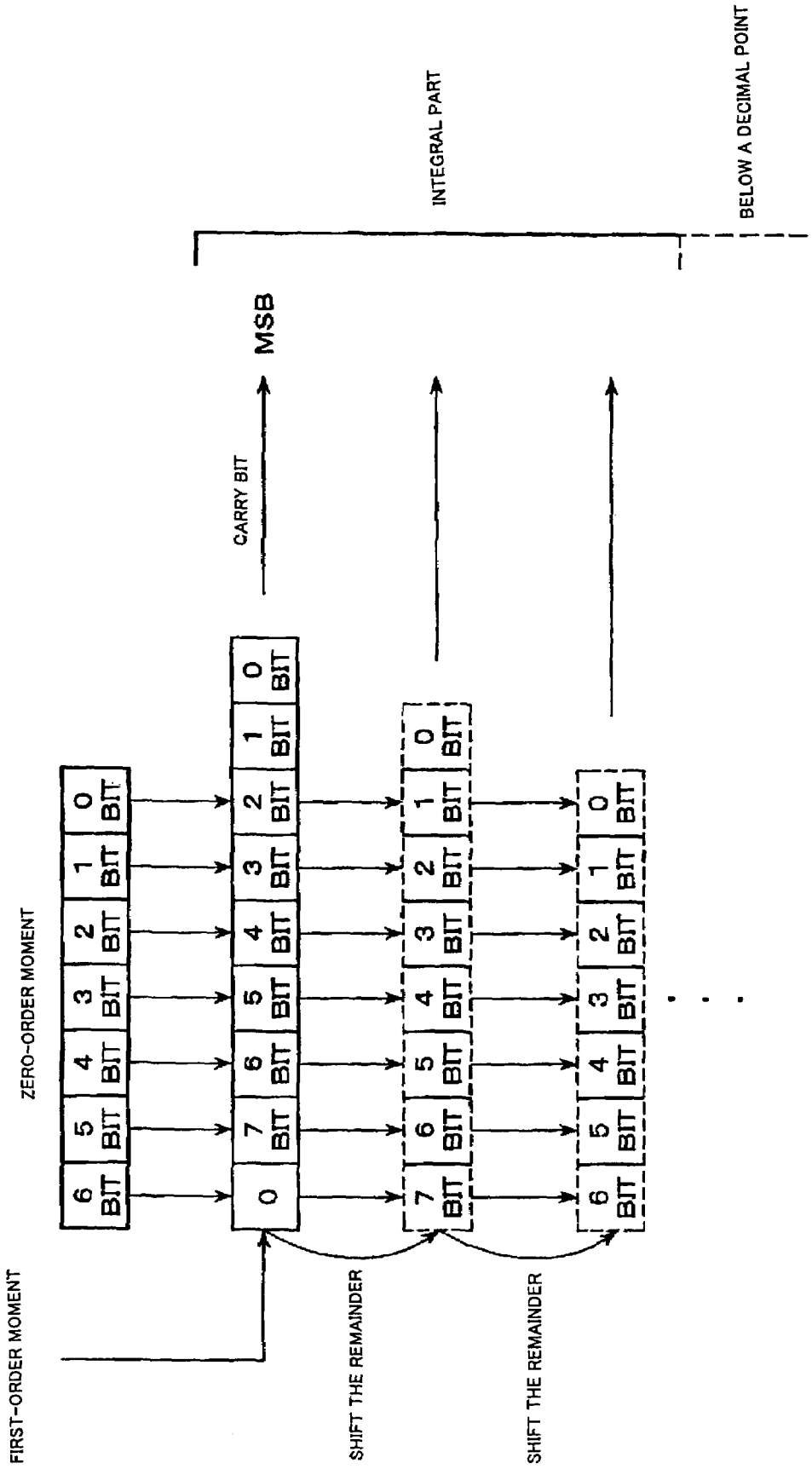
FIG. 16 is a diagram illustrating the operation of the serial divider.

Described below is the operation of the serial divider. The first-order moments AQ0 to AQ7 from the third adder are connected to the input terminals (IA in the drawing) of the multiplexers MUX0 to MUX7, and are loaded onto the D-flip-flops D-FF20 to D-FF27 at a timing of the first operation clock DIV CLK only. Here, upon receipt of the first clock, the D-flip-flop D-FF30 renders the terminal SEL to assume the high level so that the first-order moment will not be-loaded from the multiplexers MUX0 to MUX7 thereafter, and selects the input terminals IB. At the second and subsequent operation clocks DIV CLK in the operation of the divider, the subtractors SUB0 to SUB8 execute the subtraction of the zero-order moment from the high-order digit of the first-order moment loaded on the D-flip-flops D-FF20 to D-FF27, and CARRY bits (DOUT in the drawing) of the subtractors become an answer to the highest-order digit of the centroid coordinate data. When the answer is 1, the zero-order moment must be subtracted from the remainder of the subtraction when the next digit is to be calculated. Therefore, the carry bit (DOUT in the drawing) is input to the input terminals (SUB in the drawing) of all subtractors SUB0 to SUB8, and a remainder after the zero-order moment is subtracted from the high-order digit of the first-order moment is output to the output terminals (OUT). Therefore, the remainder after the zero-order moment is subtracted from the D-flip-flops D-FF20 to D-FF27 is successively shifted through the subtractors SUB0 to SUB8. When the carry bit is 0, further, 0 is input to the input terminals (SUB in the drawing) of the subtractors with multiplexer, whereby the multiplexers are changed over so that the zero-order moment is not subtracted by the subtractors SUB0 to SUB8 from the D-flip-flops D-FF20 to D-FF27 but is shifted to the next stage. The first-order moment is directly output to the output terminals (OUT). There is thus realized the operation of the serial divider 23 illustrated in FIG. 16.

In this embodiment, the number (first-order moment) by which the serial divider 23 is divided is brought to be the same figure as the number (zero-order moment) for division. This method makes it possible to minimize the circuit scale.

In the plane array of image detection processing elements, if maximum coordinates are denoted by $n_x$, $n_y$, the first-order moments by $m_{10}$, $m_{01}$, and the zero-order moment by $m_{00}$, then, there holds a relationship, $$m_{10} \leq n_x \times m_{00}$$

$$m_{01} \leq n_y \times m_{00} \quad (3)$$

From the formula (3), it is obvious that the formula (1) of centroid never exceeds the centroid coordinates.

In the case of 8×8 pixels of FIG. 1 represented by, for example, division, the centroid coordinates (x bar, y bar) do not become greater than 8. Therefore, the integer terms of not smaller 3 digit need not be calculated.

Under this condition, the memories D-FF as well as may other circuits can be employed in numbers smaller than those of general-purpose dividers, and the circuit scale can be decreased.

In this embodiment, the first-order moment is not output to external units. It is, however, allowable to output the first-order moment of interim data by taking the validity of the first-order moment into consideration as described below.

Described here are the application and validity of the first-order moment. Upon producing the first-order moment used for finding the gravity coordinate to an external unit, it is allowed to calculate character quantities other than the centroid coordinate data of a simple object. Described below is an example of application.

In tracing a plurality of objects by the image detection processing device, a problem arouses concerning the collision and separation of objects. From the area $S_i$ of the objects and the area $S_{whole}$ of the whole image, it can be judged whether the collision or the separation is taking place as described below, $$S_{whole} < \sum_{i=1}^{m} S_i \qquad \text{collision (4)}$$

$$S_{whole} > \sum_{i=1}^{m} S_i \qquad \text{separation (5)}$$

After having judged the separation, the centroid of a new object is calculated as described below. Namely, $(x_i, y_i)$ is a centroid of the objects, and $(x_{whole}, y_{whole})$ is the centroid of the whole image.

$$x_{m+1} = \frac{x_{whole} S_{whole} - \sum_{i=1}^{m} x_i S_i}{S_{whole} - \sum_{i=1}^{m} S_i} \qquad (6)$$

$$y_{m+1} = \frac{y_{whole} S_{whole} - \sum_{i=1}^{m} y_i S_i}{S_{whole} - \sum_{i=1}^{m} S_i} \qquad (7)$$

where $$\sum_{i=1}^{m} x_i S_i \quad \sum_{i=1}^{m} y_i S_i$$

are first-order moments of the x-coordinate and of the y-coordinate, which are character quantities very effective in the calculation of centroids of new objects after the separation in the collision/separation of a plurality of objects. Its algorithm has been described in a treatise "Tracking of a plurality of Objects using a High-Speed Object Tracking Vision Chip". (Memorial Lecture on the 20th Anniversary of Japanese Academy of Robotics, Osaka, Oct. 14, 2002, 3A16, T, Komuro, I Ishii M, Ishikawa, J, Yoshida).

The shift register 21, third adder 22 and serial divider having minimum bit widths make it possible to decrease the circuit scale in the FPGA even when the circuits are described in the external FPGA, and do not cause the circuit scale to increase. In the serial divider 23, further, the calculation can be effected down to decimal numbers without increasing the circuit scale, which is an advantage.

The image detection processing device of the invention makes it possible to calculate the centroid at high speeds without requiring any separate operation processing unit. The image detection processing device of the invention further has an operation function of an operation circuit of a small scale best suited for calculating the centroid data of the object, which can be arranged in the same chip as that of the image detection processing device.

What is claimed is:

1. An image detection operation processing device having, arranged on a plane, a plurality of image detection processing elements each including a light detector for effecting photoelectric conversion, a converter for converting signals from the light detector into digital signals and a first adder to which the digital signals can be input, the image detection operation processing device comprising:

a first cumulative adder constituted by connecting in series the first adders of the plurality of image detection processing elements for each of the rows:

a second cumulative adder constituted by connecting in series second adders corresponding to each of the rows and for receiving the outputs of the final stages of the first cumulative adders of each of the rows, in order to cumulatively add up the outputs of the final stages of the first cumulative adders;

a control circuit for selectively inputting the digital signals of the plurality of image detection processing elements to the first cumulative adders;

a serial-parallel converter to which are input the process data output from the second cumulative adder based on image data detected by the light detectors;

a third adder which adds up a plurality of first parallel data converted by the serial-parallel converted and outputs the added data as second parallel data; and a serial divider for dividing the second parallel data output from the third adder and the first parallel data output from the serial-parallel converter; and wherein several combinations selected from the digital signals of the image detection processing elements for each of the rows or columns are successively input to the first cumulative adders by the control circuit, the process data for each of the combinations output from the second cumulative adder are successively input to the serial-parallel converter to form first parallel data for each of the combinations, and the second parallel data obtained by adding up the first parallel data for each of the combinations while shifting them by a predetermined amount for each of the combinations through the third adder, are output as the first-order moment of the image focused on a group of the image detection processing elements.

2. An image detection operation processing device having, arranged on a plane, a plurality of image detection processing elements each including a light detector for effecting photoelectric conversion, a converter for converting signals from the light detector into digital signals and a first adder to which the digital signals can be input, the image detection operation processing device comprising:

a first cumulative adder constituted by connecting in series the first adders of the plurality of image detection processing elements for each of the rows:

a second cumulative adder constituted by connecting in series second adders corresponding to each of the rows and for receiving the outputs of the final stages of the first cumulative adders of each of the rows, in order to cumulatively add up the outputs of the final stages of the first cumulative adders;

a control circuit for selectively inputting the digital signals of the plurality of image detection processing elements to the first cumulative adders;

a serial-parallel converter to which are input the process data output from the second cumulative adder based on image data detected by the light detectors;

a third adder which adds up a plurality of first parallel data converted by the serial-parallel converted and outputs the added data as second parallel data; and a serial divider for dividing the second parallel data output from the third adder and the first parallel data output from the serial-parallel converter; and wherein several combinations selected from the digital signals of the image detection processing elements for each of the rows or columns are successively input to the first cumulative adders by the control circuit, the processing data for each of the combinations output from the second cumulative adder are successively input to the serial-parallel converter to form first parallel data for each of the combinations;

to the serial divider, there are input:

a first-order moment of the image focused on a group of the image detection processing elements represented by the second parallel data obtained by adding up the first parallel data for each of the combinations while shifting them by a predetermined amount for each of the combinations through the third adder; and a zero-order moment output from the serial-parallel converter by inputting all digital signals of the image detection processing elements to the first cumulative adders by the control circuit and by inputting the process data output from the second cumulative adder to the serial-parallel converter; and the serial divider divides the first-order moment by the zero-order moment, and operates and outputs the centroid coordinate data of the image focused on the group of image detection processing elements.

3. An image detection operation processing device according to claim 1 or 2, wherein all elements are formed on a single chip.

* * * * *